US008554688B2

(12) United States Patent
Harrell et al.

(10) Patent No.: US 8,554,688 B2
(45) Date of Patent: Oct. 8, 2013

(54) FUEL DISPENSER MANAGEMENT

(75) Inventors: Daniel C. Harrell, Round Rock, TX (US); Craig Lewis, Arvada, CO (US)

(73) Assignee: Dresser, Inc., Addison, TX (US)

( * ) Notice: Subject to any disclaimer, the term of this patent is extended or adjusted under 35 U.S.C. 154(b) by 877 days.

(21) Appl. No.: 11/558,825

(22) Filed: Nov. 10, 2006

(65) Prior Publication Data

US 2008/0040287 A1 Feb. 14, 2008

Related U.S. Application Data

(60) Provisional application No. 60/736,488, filed on Nov. 14, 2005.

(51) Int. Cl.
*G06Q 20/00* (2012.01)
(52) U.S. Cl.
USPC .......................................................... 705/64
(58) Field of Classification Search
USPC ............................................. 705/50, 64, 65
See application file for complete search history.

(56) References Cited

U.S. PATENT DOCUMENTS

| | | | |
|---|---|---|---|
| 3,786,421 A | | 1/1974 | Wostl et al. |
| 5,228,084 A | * | 7/1993 | Johnson et al. .................. 705/71 |
| 5,394,336 A | | 2/1995 | Warn et al. |
| 5,809,144 A | * | 9/1998 | Sirbu et al. ....................... 705/53 |
| 6,032,126 A | | 2/2000 | Kaehler |
| 6,098,053 A | * | 8/2000 | Slater .............................. 705/44 |
| 6,128,551 A | | 10/2000 | Davis et al. |
| 6,152,591 A | | 11/2000 | McCall et al. |
| 6,193,154 B1 | | 2/2001 | Phillips et al. |
| 6,449,287 B1 | * | 9/2002 | Leuca et al. ................... 370/468 |
| 6,618,385 B1 | * | 9/2003 | Cousins ......................... 370/401 |
| 7,496,765 B2 | * | 2/2009 | Sengoku ........................ 713/189 |
| 7,953,968 B2 | * | 5/2011 | Robertson et al. ............. 713/150 |
| 2002/0010743 A1 | * | 1/2002 | Ryan et al. ..................... 709/205 |
| 2002/0124170 A1 | * | 9/2002 | Johnson, Jr. ................... 713/176 |
| 2003/0041330 A1 | | 2/2003 | Smith |
| 2004/0010711 A1 | | 1/2004 | Tang et al. |
| 2005/0031096 A1 | * | 2/2005 | Postrel ......................... 379/88.22 |
| 2005/0141558 A1 | * | 6/2005 | Connors ........................ 370/469 |
| 2005/0206353 A1 | * | 9/2005 | Sengoku ........................ 323/210 |
| 2007/0033398 A1 | * | 2/2007 | Robertson et al. ............. 713/168 |

FOREIGN PATENT DOCUMENTS

| | | |
|---|---|---|
| FR | 2811794 | 1/2002 |
| WO | WO 98/45820 | 10/1998 |
| WO | WO 2007/018987 | 2/2007 |

OTHER PUBLICATIONS

Gulseni (Internet Banking, T.C. Marmara University Institute for Graduate Studies in Pure and Applied Sciences, Thesis, Aug. 2002, 105 pages) discloses authentication schemes involved in payment transactions.*
PCT International Preliminary Report on Patentability, PCT/US2006/043925, Mar. 18, 2008, pp. 1-11.
PCT International Search Report, PCT/US2006/043925, Apr. 24, 2007, pp. 1-4.
Written Opinion of the International Searching Authority, PCT/US2006/043925, Apr. 24, 2007, pp. 1-5.

* cited by examiner

*Primary Examiner* — James D Nigh
(74) *Attorney, Agent, or Firm* — Hiscock & Barclay LLP

(57) ABSTRACT

Systems and processes may provide for managing a fuel dispenser. In particular implementations, a system and process for a fuel dispenser may include the ability to receive at least a portion of transaction data for a fueling session, determine whether at least a portion of the received transaction data requires a security measure, and, if at least a portion of the received transaction data requires a security measure, apply a security measure to at least a portion of the received transaction data.

31 Claims, 13 Drawing Sheets

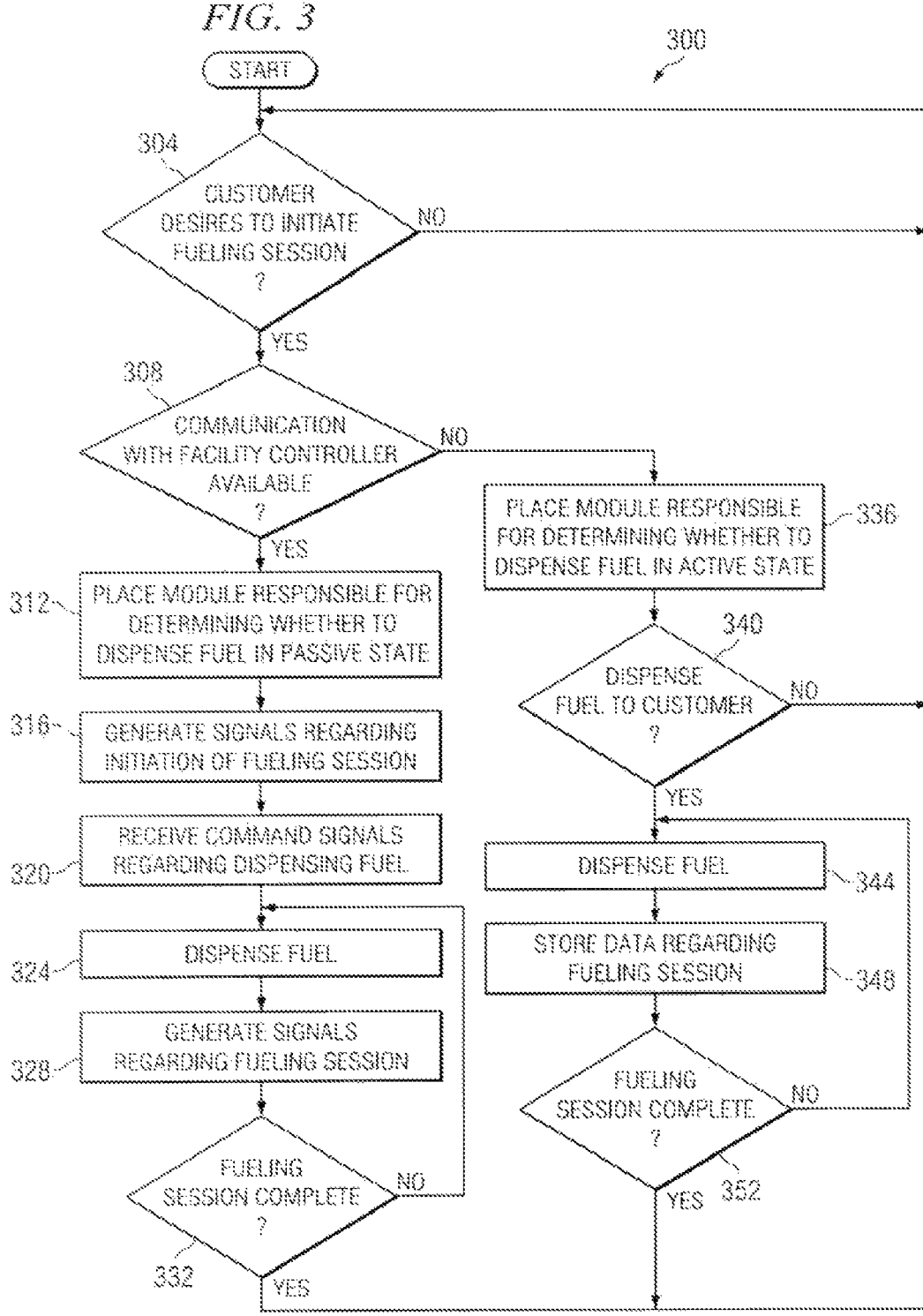

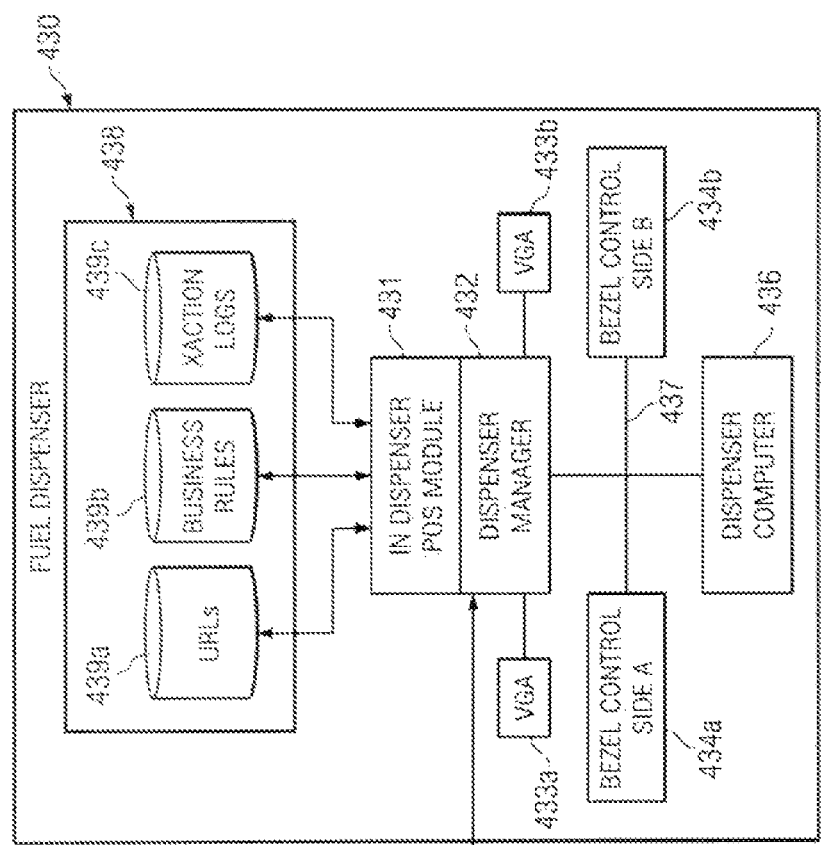
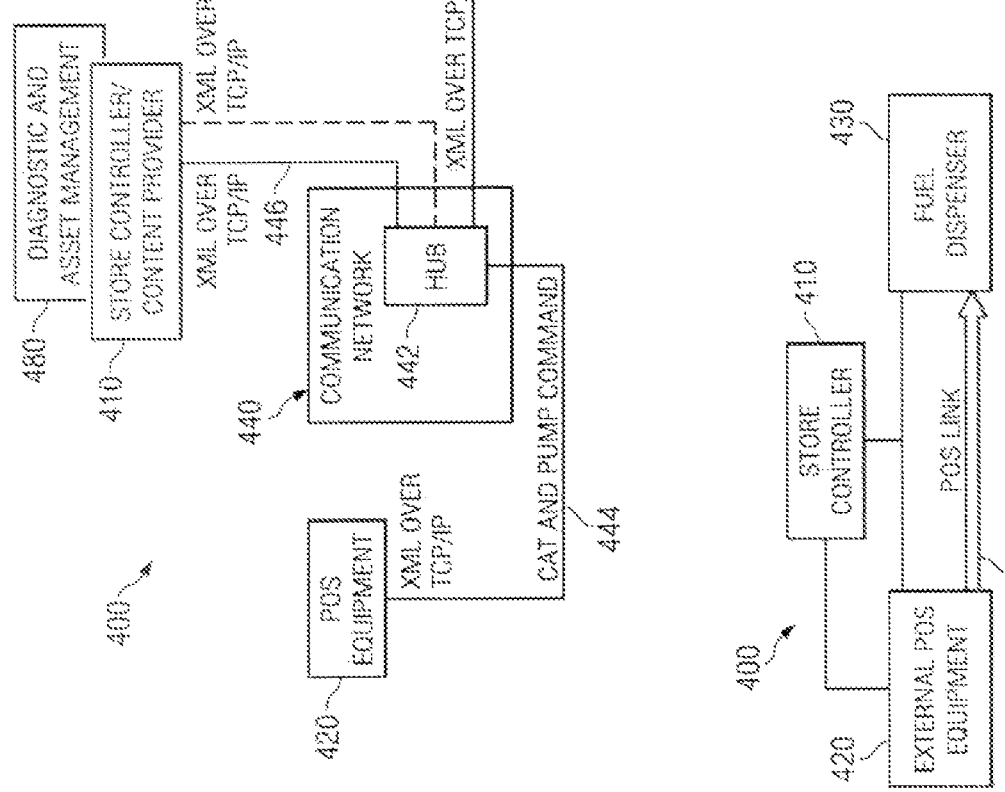
FIG. 5
FIG. 4

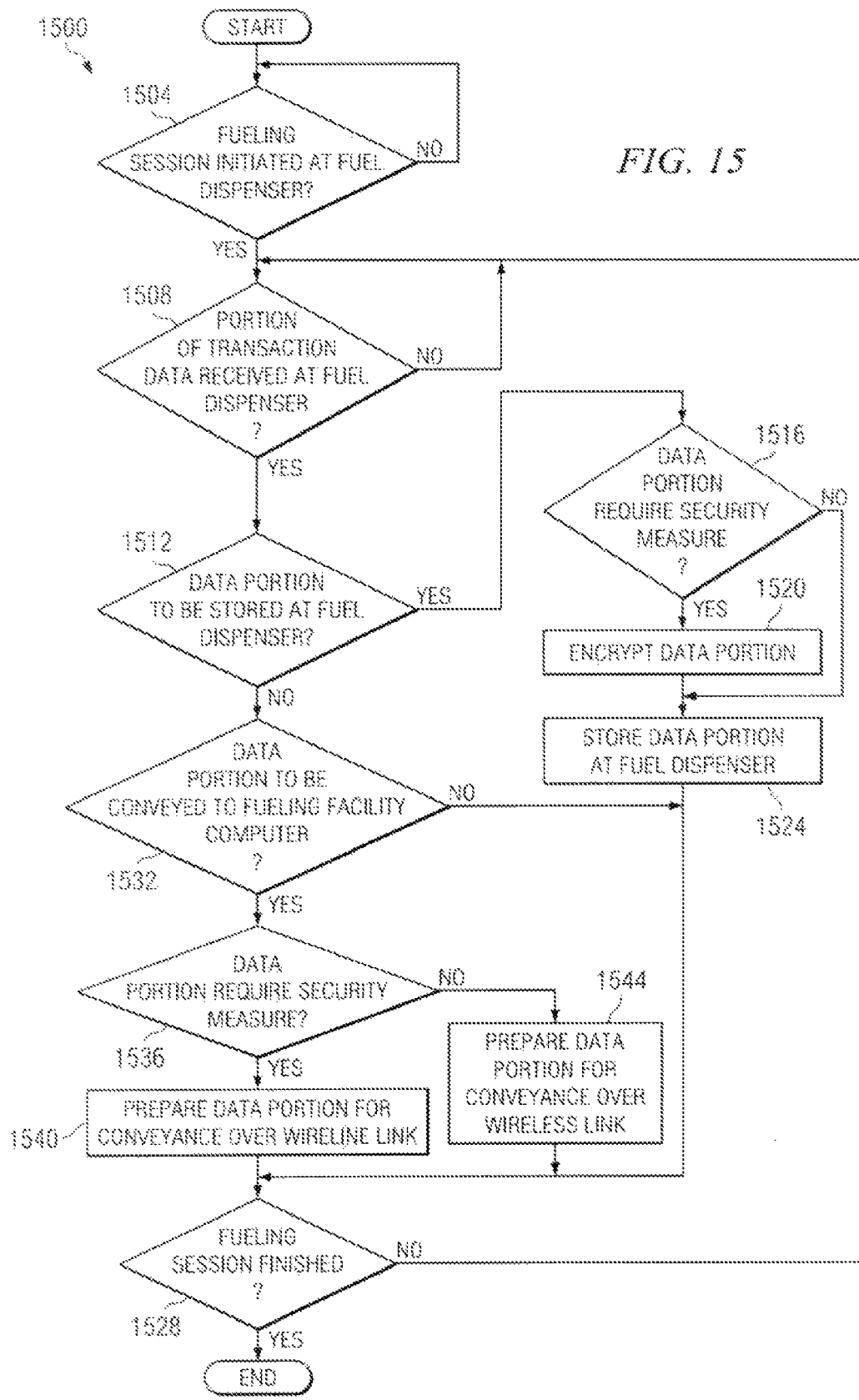

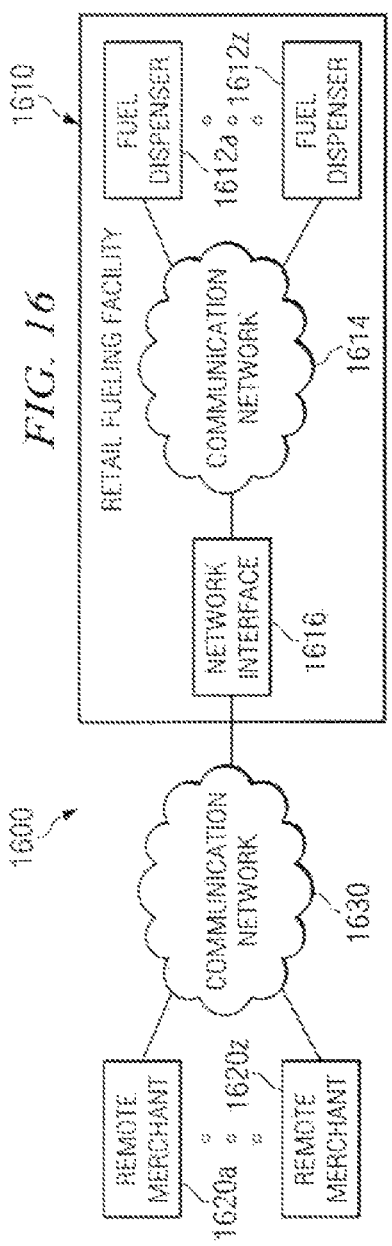
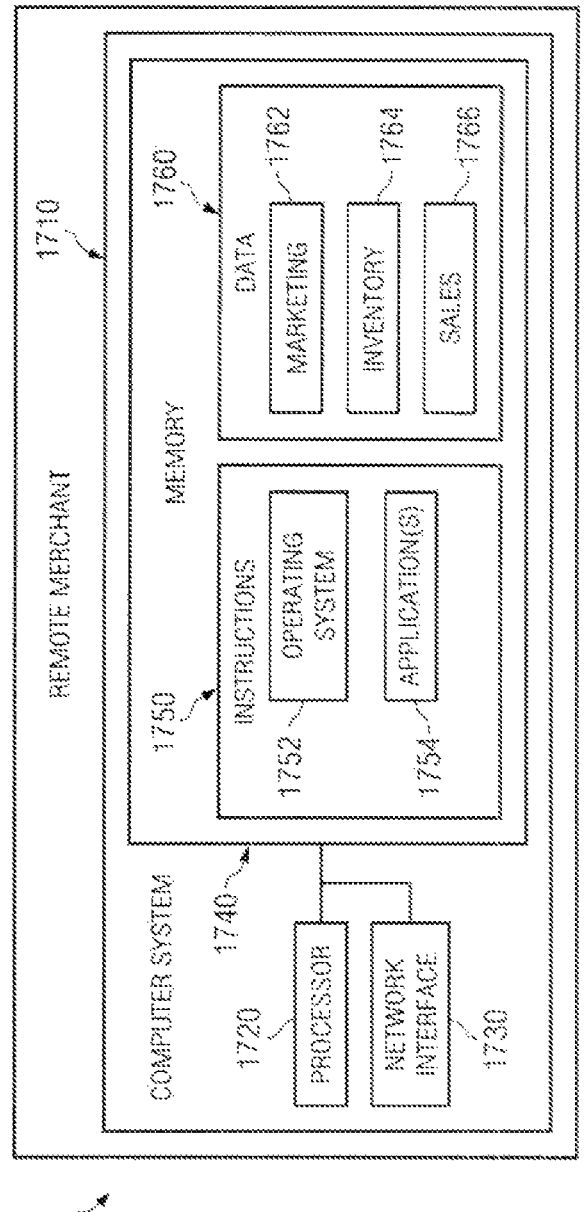

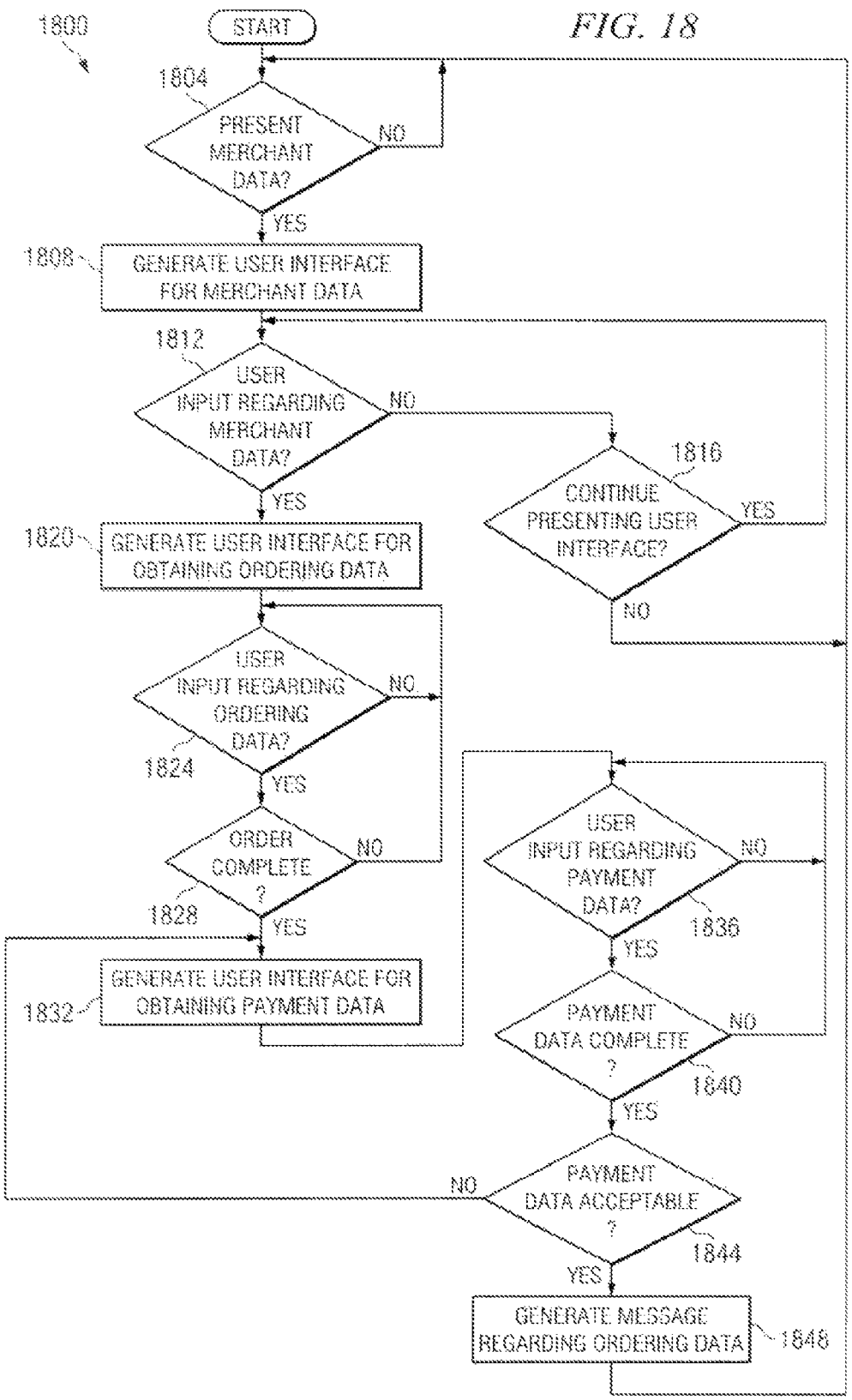

FUEL DISPENSER MANAGEMENT

RELATED APPLICATIONS

This application claims the benefit of U.S. Provisional Patent Application No. 60/736,488, entitled "Fuel Dispenser Management" and filed on Nov. 14, 2005.

TECHNICAL FIELD

The present disclosure relates to dispensing fuel and, in particular, to fuel dispensers at fueling facilities.

BACKGROUND

The retail petroleum industry utilizes various types of fuel dispensers for dispensing fuel to customers. Some form of remote dispenser controller is typically used for controlling the fuel dispensers. The dispenser controller is often on the same premises as the fuel dispensers and coupled to a store interface unit so that a site attendant can monitor and control particular fuel dispensers from a building at the site (e.g., a store). The dispenser controller sends data signals (e.g., commands) to the fuel dispensers. The data may include price, payment data for the fuel dispensed, preset amounts of fuel to dispense, and authorization to dispense fuel. The fuel dispensers likewise send data signals to the controller, including pump number, pump status, and dispensed fuel volume and sale value.

An example of one type of service that a dispenser controller commonly provides to a fuel dispenser is point-of-sale (POS). POS services may, for example, include cash register, dispenser control, credit card, inventory management, processing, and scanning. POS services are commonly implemented in a dispenser controller utilizing an open architecture hardware platform with POS application software programming to integrate the services.

Unfortunately, the communication system coupling the dispenser controller and the fuel dispensers is not particularly fault tolerant. Thus, the communications between a dispenser controller and a fuel dispenser are often interrupted, leading to a loss of ability to provide services to the fuel dispenser (e.g., financial transactions and pump functions). The fuel dispensers may also be inoperable for appreciable periods of time and not able to achieve their primary function (i.e., dispensing fueling), which can be an inconvenience to customers and a lost source of revenue to retail fueling facilities.

SUMMARY

Fuel dispenser management may be accomplished by a variety of systems and techniques at fuel dispensers. The systems and techniques may improve the safety, reliability, and/or efficiency of the fuel dispensers.

In one general aspect, a process performed at a fuel dispenser may include receiving at least a portion of transaction data for a fueling session and determining whether at least a portion of the received transaction data requires a security measure. The transaction data may, for example, include financial information of a customer. If at least a portion of the received transaction data requires a security measure, the process may call for applying a security measure to at least a portion of the received transaction data. The process may be performed by a machine, a processor executing instructions encoded on a machine-readable medium, or other appropriate apparatus.

In some implementations, determining whether at least a portion of the received transaction data requires a security measure may include determining whether at least a portion of the data is to be stored at the fuel dispenser for more than a transitory period of time. Data may be stored at the fuel dispenser for more than a transitory period of time, for example, if the fuel dispenser is not able to communicate with a fueling facility computer. The security measure may include encrypting at least a portion of the received transaction data that requires the security measure. The encryption may, for example, use a symmetric key of 512 bits.

In certain implementations, determining whether at least a portion of the received transaction data requires a security measure may include determining whether at least a portion of the data is to be communicated to a fueling facility computer. The security measure may include preparing at least a portion of the received transaction data that requires a security measure for conveyance over a wireline communication link and preparing at least a portion of the received transaction data that does not require a security measure for conveyance over a wireless communication link. The security measure may also include encrypting at least a portion of the received transaction data that requires a security measure before conveyance over a communication link.

In another general aspect, a fuel dispenser may include a user input device and a processor. The user input device may be operable to receive at least a portion of transaction data for a fueling session. The processor may be operable to determine whether at least a portion of the received transaction data requires a security measure and, if at least a portion of the received transaction data requires a security measure, apply a security measure to at least a portion of the received transaction data.

The fuel dispenser may include a memory. The memory may, for example, include a rule set, and the processor may be operable to make the determination based on one or more rules in the rule set.

In certain implementations, the processor may be operable to determine whether at least a portion of the received transaction data is to be stored at the fuel dispenser for more than a transitory period of time to determine whether at least a portion of the data requires a security measure. Data may be stored at the fuel dispenser for more than a transitory period of time if, for example, the fuel dispenser is not able to communicate with a fueling facility computer. The processor may be operable to encrypt at least a portion of the received transaction data that requires the security measure to apply the security measure.

In some implementations, the processor may be operable to determine whether at least a portion of the received transaction data is to be communicated to a fueling facility computer to determine whether at least a portion of the data requires a security measure. To apply the security measure, the processor may be operable to prepare at least a portion of the received transaction data that requires a security measure for conveyance over a wireline communication link and prepare at least a portion of the received transaction data that does not require a security measure for conveyance over a wireless communication link. The security measure may also include encrypting at least a portion of the received transaction data that requires a security measure before conveyance over a communication link.

Various implementations may include one or more features. For example, by applying security measures to data stored at a fuel dispenser, sensitive data may be protected. Furthermore, by selectively applying the security measures to the stored data, processing power may be conserved. As another example, by applying security measures to data to be sent from a fuel dispenser, sensitive data may again be protected. Moreover, by selectively applying the security measures, bandwidth resources on one or more communication networks may be conserved and reliability may be improved.

The details of one or more implementations are set forth in the accompanying drawings and the description below. Other features will be apparent from the description and drawings, and from the claims.

DESCRIPTION OF DRAWINGS

FIG. 3 is a flow chart illustrating one implementation of a process for fuel dispenser management.

FIG. 4 is a block diagram illustrating another implementation of a system for fuel dispenser management.

FIG. 5 is a block diagram illustrating a detailed implementation of the system of FIG. 4.

FIG. 15 is a flow chart illustrating another example of a process for managing a fuel dispenser.

FIG. 16 is a block diagram illustrating a system for fuel dispenser commerce.

FIG. 17 is a block diagram illustrating one example of a system component for fuel dispenser commerce.

FIG. 18 is a flow chart illustrating a process for fuel dispenser management.

Like reference symbols in the various drawings indicate like elements.

DETAILED DESCRIPTION

Safety, reliability, and efficiency for fueling facilities may be improved by intelligent control of fuel dispensers. These benefits may apply not only to the actual dispensing of fuel at a fuel dispenser, but also to the customer to which the fuel is being dispensed. In particular implementations, a fueling facility process and/or system may include the ability to provide enhanced safety, reliability, and/or efficiency by providing enhanced management at one or more fuel dispensers. The enhanced management may, for example, provide point-of-sale functions, fuel dispenser coordination, fuel dispenser diagnostics, data security, and sales capabilities for remote merchants. Other implementations may include one or more of these features as well as additional features.

Figure 1:
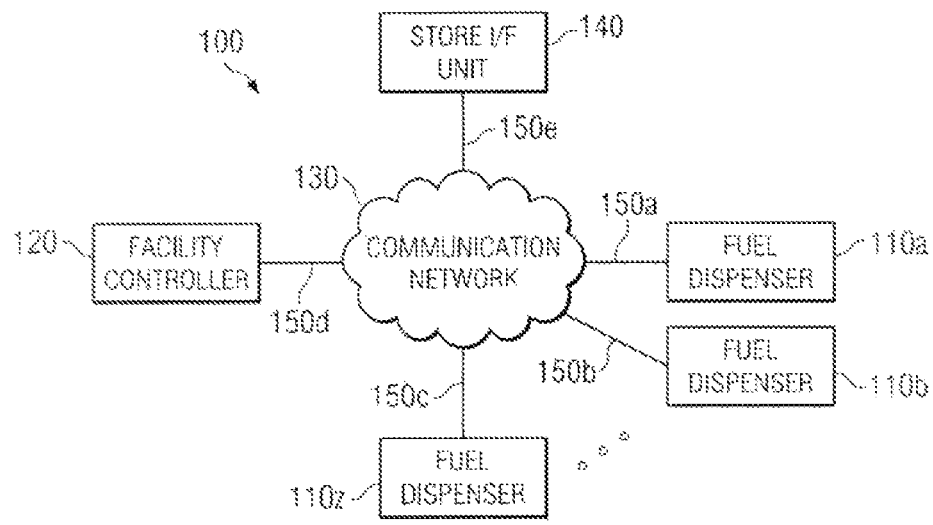
FIG. 1 is a block diagram illustrating one implementation of a system for fuel dispenser management.

FIG. 1 illustrates one implementation of a system 100 for fuel dispenser management. As illustrated, system 100 represents a retail fueling facility, and could be representative of a gas station environment, a convenience store environment, or any other appropriate type of retail fueling facility.

System 100 includes fuel dispensers 110, a facility controller 120, a communication network 130, and a store interface unit 140. Fuel dispensers 110 are operable to dispense fuel (e.g., gasoline, diesel, liquid propane, or ethanol) to customers at system 100, typically under at least partial control of facility controller 120. Communication network 130 allows facility controller 120 to communicate with fuel dispensers 120. Communication network 130 also allows fuel dispensers 110 and facility controller 120 to communicate with store interface unit 140. Store interface unit 140 is also operable to provide control functions to fuel dispensers 110.

In more detail, fuel dispensers 110 may be fuel dispensers, pumps, or any other appropriate fuel dispensing apparatuses. Fuel dispensers 110 may have single or multiple hose configurations. Depending on their configuration, fuel dispensers 110 may dispense one or more products (e.g., gasoline and diesel). Fuel dispensers 110 typically operate in cooperation with facility controller 120 and store interface unit 140 to dispense fuel. In doing so, a fuel dispenser may recognize when a customer is present (e.g., by detecting activation of an input device or removal of a pump handle) and notify facility controller 120, which may then obtain payment information from the customer, authenticate the customer, and allow fuel dispensing to begin. The fuel dispenser may also communicate the dispensed amount of fuel to the facility controller, which may complete the sales transaction when the customer is finished dispensing fuel. The fuel dispensers may, however, operate independently of the facility controller and/or the store interface unit for certain tasks and/or periods of time, as will be explained below.

Facility controller 120 may be a server, a personal computer, or any other appropriate device for interacting with and controlling fuel dispensers 110. Facility controller 120 typically includes a processor (e.g., a microprocessor, a microcontroller, or any other appropriate device for manipulating information in a logical manner) and memory (e.g., random access memory (RAM), read-only memory (ROM), compact-disk read-only memory (CD-ROM), programmable read-only memory (PROM), a hard drive, and/or any other appropriate information storage device) that stores instructions and/or data for the processor. The instructions may, for example, include an operating system (e.g., Linux, Unix, or Windows) and applications (e.g., fuel dispenser control, accounting, and diagnostics). Facility controller 120 may, for example, provide authorization, financial transaction, and fuel dispensing management for fuel dispensers 110. To accomplish this, facility controller 120 may provide one or more operational commands to the fuel dispensers. In particular implementations, a processor may be a single or dual 32-bit processor operating at 600 MHz, and memory may include 512 MB of main memory and 4 GB of storage. The facility controller may be located in or external to a store at a fueling facility.

Communication network 130 allows fuel dispensers 110 and facility controller 120, as well as store interface unit 140, to communicate with each other. Communication network 130 may operate according to any appropriate communication technique, including wireline (e.g., IEEE 802.3 or RS-232), wireless (e.g., IEEE 802.11, CDMA 2000, or GPRS), or optical (e.g., FDDI or SONET). Communication network 130 may include one or more components for facilitating communication, such as hubs, routers, switches, bridges, repeaters, multiplexers, and transceivers. In particular implementations, communication network 130 may operate by a combination of communication techniques.

Communication network 130 is coupled to fuel dispensers 110, facility controller 120, and store interface unit 140 by communication links 150. Communication links 150 may be wireline (e.g., twisted pair wire or coaxial cable), wireless (e.g., radio frequency (RF) or infrared (IR)), optical (e.g., fiber-optic cable), and/or any other appropriate path for conveying information. In particular implementations, communication links 150 may include a combination of communication link types (e.g., wireline and wireless).

Store interface unit 140 may be a server, a personal computer, a data terminal, or any other appropriate device for interacting with fuel dispensers 110 and/or facility controller 120. Store interface unit 140 may include a processor and memory that stores instructions and/or data for the processor. Store interface unit 140 also typically includes a user input device (e.g., a keypad, a keyboard, a touch screen, and/or a pointing device) and a display device (e.g., a CRT or LCD monitor). Store interface unit 140 may, for example, allow a store attendant to provide authorization and financial transaction services for fuel dispenser 110. To accomplish this, the store interface unit may provide operational commands (e.g., dispense fuel, reserve for specific monetary amount, or print receipt) to the fuel dispensers. Store interface unit 140 may operate in conjunction with facility controller 120 to provide these services.

In one mode of operation, when one of fuel dispensers 110 detects the presence of a facility customer (e.g., by detecting removal of a pump handle, activation of a user input device, insertion of a payment card, or presence of a customer identifier), the fuel dispenser issues a notification to facility controller 120. Facility controller 120 may then determine the technique by which the customer plans to pay for the fuel to be dispensed (e.g., pay at the fuel dispenser or pay in the store). If the customer indicates that she is planning to pay at the fuel dispenser, the facility controller may request that the customer present a customer identifier (e.g., a payment card or an RFID tag) before allowing the customer to dispense fuel. If the customer indicates that she is planning to pay in the store, the facility controller may notify the store attendant and allow the store attendant to make a decision regarding whether fuel should be dispensed.

In the case that the customer indicates she is planning to pay at the fuel dispenser, the facility controller may prompt the fuel dispenser to request presentation of the customer identifier. The fuel dispenser may then wait for presentation of the customer identifier (e.g., insertion of a payment card) and read the information contained thereon.

Typically, at least some customer identification data is sent from the fuel dispenser to facility controller 120. The facility controller may then determine the validity of the customer identifier. Determining the validity of the customer identifier may include performing a checksum of the data received therefrom or contacting the issuer of the customer identifier to determine whether the customer identifier is valid. Also, the facility controller may check the authorization of the customer identifier. For example, the facility controller may contact a payment card issuer to determine the credit limit of a payment card.

If the facility controller determines that the customer identifier is valid and/or authorized, the facility controller may activate the fuel dispenser, which may then dispense fuel to the customer. While fuel is being dispensed, the fuel dispenser may provide the facility controller with data regarding the dispensing (e.g., type of fuel being dispensed and amount of fuel being dispensed). When the customer is finished dispensing fuel (e.g., indicated by replacement of the pump hand), the facility controller may determine a total price for the dispensed fuel and seek approval for the total price. Once approval has been granted, the facility controller may cause a receipt to be printed for the customer.

In certain modes of operation, however, one or more of fuel dispensers 110 may be able to operate independently of facility controller 120, at least for a certain functions and/or periods of time. This may be especially advantageous if facility controller 120, communication network 130, and/or communication links are prone to failure, which they often are.

As one example of independent operation, fuel dispensers 110 may include the ability to provide point-of-sale (POS) operations. That is, the customer may purchase fuel from a fuel dispenser without it having to be in contact with the facility controller or the store interface unit. Thus, if facility controller 120, communication network 130, and/or store interface unit 140 is inoperative, the fuel dispenser may continue dispensing fuel. To accomplish this, a fuel dispenser may, for example, be able to provide appropriate interaction with a customer (e.g., request customer identifier) and perform authentication operations for customer identification data (e.g., checksums). Not all authentication operations, for PINs, for example, in some implementations, may be able to be performed. The fuel dispenser may also be able to record dispensing and financial aspects of a fueling session and provide appropriate commands to the fuel dispenser's components. The recorded dispensing and financial data may be provided to the facility controller for operations management and account reconciliation when communication therewith is reestablished.

As another example of independent operation, a fuel dispenser may determine how to handle data (e.g., from the customer identifier). For example, if a portion of data is to be sent to the facility controller and the fuel dispenser can communicate with the facility controller through more than one type of communication link (e.g., wireline and wireless), the fuel dispenser may determine which communication link to use to covey the data portion. For instance, some wireless techniques (e.g., IEEE 802. 11) may be faster than some wireline techniques (e.g., RS-422), and do not require the same type of semi-permanent infrastructure (e.g., wires buried under concrete), but wireline links may provide more security (e.g., by being less accessible to eavesdroppers). The fuel dispenser may, thus, make the communication link determination based on the sensitivity of the type of data, which may have been predesignated. In particular implementations, for example, the fuel dispenser may send sensitive types of data over a wireline link and non-sensitive types of data over a wireless link. A determination may also be made as to whether to encrypt the data before sending it. As another example, if a portion of the data is to be stored at the fuel dispenser (perhaps because communication with the facility controller is unavailable), the fuel dispenser may determine whether the data should be encrypted. The fuel dispenser may, for example, make the determination based on the sensitivity of the type of data. Encrypting a data portion may be accomplished by any appropriate type of encryption scheme (e.g., public key or private key).

While FIG. 1 illustrates one implementation of a system for fuel dispenser management, other implementations may have fewer, additional, and/or a different arrangement of components. For example, a system may not have a store interface unit. As another example, the facility controller may be co-located with or part of store interface unit 140. As a further example, the facility controller may be coupled to one or more off-site computer systems (e.g., a payment card issuer or a fuel supply system). The components and techniques discussed with respect to this implementation may also find use in a wide variety of other types of systems.

Figure 2:
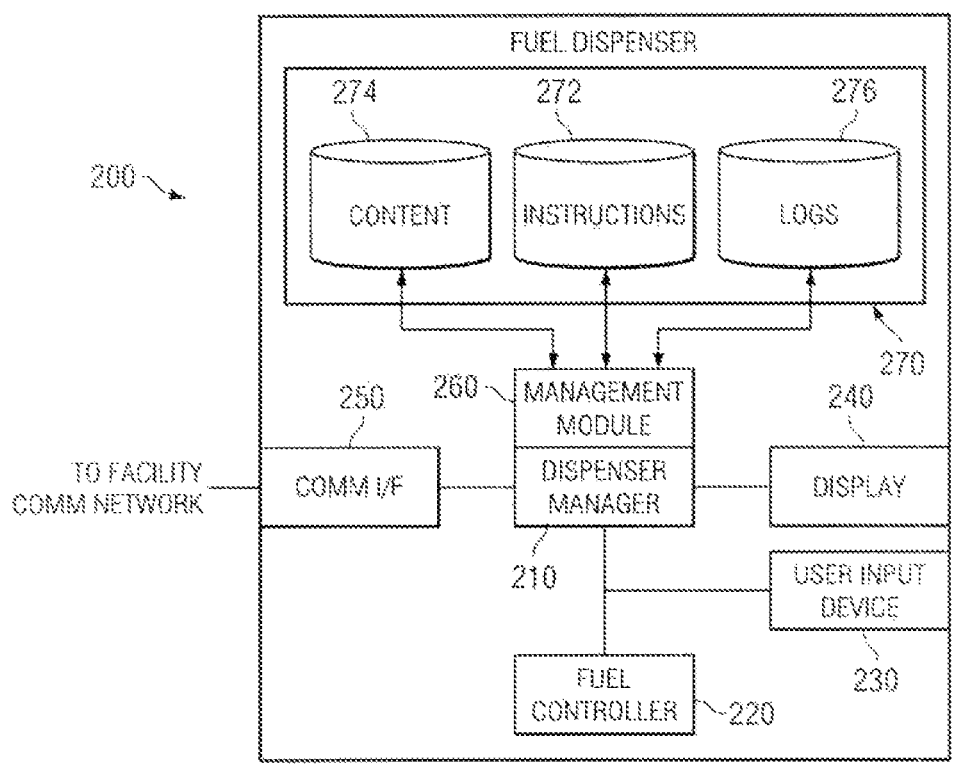
FIG. 2 is a block diagram illustrating one implementation of a fuel dispenser for fuel dispenser management.

FIG. 2 illustrates one implementation of a fuel dispenser 200 for fuel dispenser management. Fuel dispenser 200 includes a dispenser manager 210, a fuel controller 220, a user input device 230, a display 240, a communication interface 250, and a management module 260. Fuel dispenser 200 may be one example of a fuel dispenser 110 for system 100.

Dispenser manager 210 is responsible for managing the operations of fuel dispenser 200. To accomplish this, the dispenser manager may control the electronic functions of fuel dispenser 200. The dispenser manager may also collect and maintain status information regarding the fuel dispenser and report the status information to a facility controller. Dispenser manager 210 may be implemented in software, hardware, or a combination thereof. As part of its functions, dispenser manager 210 may drive the content presented on display 240.

Fuel controller 220 controls the dispensing of fuel from fuel dispenser 200. To accomplish this, fuel controller 220 may control the hydraulic elements of the dispenser necessary to carry out fuel dispensing operations. For example, fuel controller 220 may control submersible pumps in fuel storage tanks and fuel control valves and monitor fuel flow information via metering and reporting sub systems. Fuel controller 220 may also track the volume of fuel dispensed totals by grade, drive sale progress displays on the sales/volume displays, and monitor for errors. Fuel controller 220 may be implemented in software, hardware, or a combination thereof.

User input device 230 is coupled to dispenser manager 210 and allows a customer of a fueling facility to interact with the fuel dispenser. User input device 230 may be a keypad, a keyboard, a touchpad, a touch screen, a card reader, or any other appropriate device for allowing a user to provide an indication to the fuel dispenser. If user input device 230 has portions, the portions may have static and/or rearrangeable (e.g., software programmable) functions.

Display 240 is also coupled to dispenser manager 210 and allows a customer of a fueling facility to receive data from the fuel dispenser. Display 240 may be a cathode ray tube (CRT) monitor, a liquid crystal display (LCD) monitor, a gas-plasma monitor, or any other appropriate device for visually presenting information. The content for display 240 may be provided by a facility controller and/or management module 260. If display 240 has portions, the portions may have static and/or rearrangeable functions (e.g., software programmable). In some implementations, the user input device and the display may work in concert with each other (e.g., the display may present instructions or data for the user input device and/or input from the user input device may correlate with data presented on the display).

Communication interface 250 is also coupled to dispenser manager 210 and allows the fuel dispenser to communicate with other components at a fueling facility. Communication interface 250 may be a modem, an RS-232 transceiver, a wireless transceiver, or any other appropriate device for sending and/or receiving information.

Management module 260 provides fuel dispenser 200 with the ability to operate independently of a facility controller, at least for certain operations and/or periods of time. These operations may, for example, allow the fuel dispenser to continue selling fuel when communication interface 250 is unable to send and/or receive data.

Management module 260 may access memory 270, which may be RAM, ROM, CD-ROM, and/or any other appropriate information storage device. Memory 270 includes instructions 272, content 274, and logs 276. Instructions 272 dictate at least some of the operations of management module 260. Content 274 may be text, graphics, images, and/or video for presentation on display 240. Content 274 may be presented in accordance with instructions 272. Logs 276 may contain data regarding transactions (e.g., fueling sessions, financial payment, or otherwise) and errors. By analyzing logs 276, transactions may be recreated and analyzed, and errors may be identified and assessed.

Management module 260 may, for example, be implemented as a rule engine. In such an implementation, instructions 272 may be rules (e.g., customer interaction rules and transaction processing rules), content 274 may store data for implementing the results of rules, and logs 276 may store data for processing the rules. Rule engines typically have a set of conditions that are precursors to a result being implemented. The conditions may also be preconditions to other conditions. Rule engine techniques that may be used for management module 260 include those of JRules from ILOG, Inc. of Mountain View, Calif., Jess from Sandia National Laboratories of Livermore, Calif., or any other appropriate rule engine scheme. Management module 260 may be implemented using one or more programming and messaging technologies, including HTTP, TCP/IP, XML, SOAP, Universal Description, Discovery and Integration (UDDI), Microsoft .NET, or Java™. Portions of the module, for example, may be written in C++ in combination with other programming technologies (e.g., .NET) or any other appropriate technologies.

In one mode of operation, dispenser manager 210 operates under the control of a facility controller while the dispenser manager is able to communicate with a facility controller. Management module 260 may stand by in a passive mode during this time. The facility controller may provide content to be displayed on display 240, handle point-of-sale transactions (e.g., verify and charge credit cards), and provide any other appropriate services to the fuel dispenser.

When dispenser manager is unable to communicate with a facility controller, however, management module 260 may perform one or more duties of the facility controller. For example, management module 260 may provide content 274 to display 240. The content may, for example, allow a user to interact with fuel dispenser 200 to initiate and complete a fueling session (e.g., by providing customer instructions), the fueling facility to provide advertising at fuel dispenser 200, or any other appropriate operation. The content may be provided according to instructions 272. For instance, content to initiate a fueling transaction may be provided when an indication that a customer has interacted with the fuel dispenser has been detected.

As another example, management module 260 may provide processing for the financial transaction required for a fueling session (e.g., a POS transaction), allowing the fuel dispenser to dispense fuel even if the facility controller or communication network are inoperative. POS services could include cash register, dispenser control, transaction card processing, and/or bar code scanning.

For instance, the management module may determine whether to initiate a fueling session and, if a fueling session is to be initiated, to record the pertinent portions of the transaction (e.g., time of day, credit card number, current price, purchased quantity, and purchased amount). The pertinent portions of the transaction may be recorded in logs 276. In determining whether to initiate a fueling session, management module 260 may validate customer identification information (e.g., by performing a checksum) and may determine whether the fuel dispenser is still allowed to dispense fuel. For example, the fuel dispenser may be allowed to independently dispense fuel for a certain amount of time (e.g., six hours), for a certain number of transactions (e.g., twenty-five) for a certain quantity of fuel (e.g., five-hundred gallons), and/or for a certain purchase amount (e.g., one-thousand dollars). For specific transactions, the fuel dispenser may determine whether the customer identification data is valid and/or limit the transaction to a certain amount (e.g., fifty dollars). The determinations may occur according to instructions 272.

The management module may also generate representations of appropriate dispenser control signals for dispenser manager 210. For example, substitutes for customer activated terminal (CAT) and pump commands, which are normally sent from the facility controller, could be provided.

When dispenser manager 210 is again able to communicate with the facility controller, management module 260 may download the transaction data from logs 276. The facility controller may then process the financial data and send the data to the appropriate entity (e.g., payment card issuer or electronic clearing house (ECH)) for completion of the financial transaction. The facility controller may also update its information regarding the fueling facility (e.g., amount of fuel remaining).

In certain modes of operation, the management module may also be active while the fuel dispenser is communicating with a facility controller. Types of services that the management module may provide include POS, fuel dispenser coordination, fuel dispenser diagnostics, data security, and sales capabilities for remote merchants. POS functions, which were discussed above, may, for example, be provided at a fuel dispenser on a full time, or close to full time, basis.

For fuel dispenser coordination, the management module may generate messages for other fuel dispensers at the fueling facility to assist it in the fuel dispenser's operations. For example, the management module may request another fuel dispenser to image an area in the vicinity of the management module's fuel dispenser. The image may then be sent to the requesting management module for storage and later destruction, analysis, and/or communication. As another example, the management module may request another fuel dispenser to perform a customer-interaction function for the management module's fuel dispenser. For instance, the management module may request another fuel dispenser to receive data (e.g., a customer payment card) or output data (e.g., print a receipt) for the fuel dispenser. If POS services are unavailable from a central component (e.g., a facility controller), the fuel dispensers may coordinate their operations to appropriate levels (e.g., dispense no more than 500 gallons or $1,000). The ability to coordinate fuel dispensers will be discussed further below.

As one example of fuel dispenser diagnostics, the management module may determine whether a detected condition requires a response and facilitate the response. Conditions that could necessitate a response include environmental, mechanical, electrical, and/or logical instruction conditions, such as, for example, temperature, pressure, humidity, fuel leaks, open panels, dispenser intrusion, power irregularities, watchdog timer expiration, or software exceptions. Facilitating a response could include restarting the fuel dispenser, shutting down the fuel dispenser, downloading instructions for the fuel dispenser, and/or generating notifications for other components at the fueling facility. The ability to perform fuel dispenser diagnostics will be discussed further below.

For data security, the management module may determine which, if any, data to apply security measures (e.g., encryption or routing) to. A customer's financial data (e.g., credit card number, PIN, etc.) is one example of data that may require a security measure. The security measure may safely store the data at the fuel dispenser and/or convey it to another facility component (e.g., the facility controller). The ability to provide data security will be discussed further below.

As one example of providing sales capabilities for remote merchants, the management module may allow a fuel dispenser to market and sell the goods and/or services of remote merchants, which may be coupled to the fuel dispenser through a communication network. The remote merchants may be any appropriate sellers of goods and/or services.

To provide the sales capabilities, the remote merchants may download data to the fuel dispensers before (e.g., at one or more times during the day) and/or during customer interaction therewith (e.g., when a customer indicates interest in a product or service). The data may include information regarding a merchant's products and/or services, ordering information, and/or delivery information. The fuel dispenser may be responsible for handling the interactions with the customer (e.g., presenting merchant data, obtaining order and payment information, and verifying payment data), or a merchant computer (e.g., a Web server) may assist the fuel dispenser with one or more of these operations (e.g., obtaining payment information and verifying payment data). The ability to provide sales capabilities for remote merchants will be discussed further below.

In certain implementations, management module 260 may be responsible for providing messages (e.g., commands and/or data) to dispenser manager 210 to accomplish the module's operations. For example, the management module may forward or replace messages (whether in the form of structured messages, unstructured messages, or signals) from a remote computer (e.g., a facility controller). The management module may, for instance, receive a command message from a remote computer and determine that the message should be provided to the dispenser manager 210 in an unaltered state. This may, for example, occur when the fuel dispenser is operating in a normal mode and the message relates to normal operations. The management module 260 may, thus, pass the message through to the dispenser manager. As another example, the management module 260 may have one or more particular techniques for communicating with the dispenser manager and, thus, replace a message from a remote computer with a message that accomplishes the same function. As a further example, the management module 260 may determine that it desires the fuel dispenser to perform a function and issue a message to the dispenser manager 210 in furtherance of performance of the function. For example, substitutes for customer activated terminal (CAT) and pump messages, which are normally sent from a facility controller, could be provided.

Although FIG. 2 illustrates one implementation of a fuel dispenser, other fuel dispenser implementations may include fewer, additional, and/or a different arrangement of components. For example, a fuel dispenser may not include content, as it may not be required for customer operation of the fuel dispenser. As another example, a fuel dispenser may include a number of displays and user input devices, especially if the fuel dispenser has multiple dispensing sides. As a further example, memory for the management module may be shared with memory for the dispenser manager. Moreover, the memory for the management module may have various forms and/or arrangements.

FIG. 3 illustrates one implementation of a process 300 for fuel dispenser management. Process 300 may, for example, illustrate one mode of operation for one of fuel dispensers 110 in system 100.

Process 300 begins with waiting until a customer desires to initiate a fueling session (operation 304). Determining whether a customer desires to initiate a fueling session may, for example, be accomplished by detecting the removal of a pump handle, the activation of a keypad, or the insertion of a payment card.

When a customer desires to initiate a fueling session, process 300 calls for determining whether communication with a facility controller is available (operation 308). Determining whether communication with a facility controller is available may, for example, be accomplished by determining whether a facility controller responds to status requests. If communication with a facility controller is available, process 300 continues with placing a module responsible for determining whether to dispense fuel in a passive state (operation 312) and generating signals regarding initiation of a fueling session (operation 316). The module may, for example, be a point-of-sale module, and the signals may indicate to a facility controller that a customer desires a fueling session.

Process 300 continues with receiving command signals regarding dispensing fuel (operation 320). These signals may, for example, include information regarding retrieving payment data from a customer and dispensing authorization. Process 300 also calls for dispensing fuel (operation 324) and generating signals regarding the fueling session (operation 328). The signals may, for example, indicate the fuel dispenser status (e.g., pumping) and the status of the session (e.g., amount of fuel dispensed). Process 300 also includes determining whether the fueling session is complete (operation 332). Determining whether the fueling session is complete may, for example, be accomplished by detecting that a pump handle has been replaced, the activation of a keypad, or any other appropriate session completion indication.

If the fueling session is complete, the process calls for returning to wait until a customer desires to initiate a fueling session (operation 304). If, however, the fueling session is not complete, the process calls for continuing to dispense fuel (operation 324).

When a customer desires to initiate a fueling session and communication with a facility controller is not available, process 300 calls for placing the module responsible for determining whether to dispense fuel into an active state (operation 336) and determining whether to dispense fuel to the customer (operation 340). Determining whether to dispense fuel may, for example, be accomplished by requesting customer identification data from the customer and analyzing the data to determine whether it is acceptable. For instance, an error check (e.g., checksum) could be performed on the customer identification data. As another example, the fuel dispenser could determine whether it is still operating within one or more pre-established guidelines (e.g., dispense no more than five-hundred gallons of fuel when module is active).

If fuel should not be dispensed to the customer, process 300 calls for returning to wait until a customer desires to initiate a fueling session (operation 304). If, however, fuel should be dispensed to the customer, process 300 calls for dispensing fuel (operation 344). Dispensing fuel may, for example, include generating an activation signal for a fuel controller. Process 300 also calls for storing data regarding the fueling session (operation 348). The data may, for example, be stored in a transaction log and could include time, date, customer identification data, dispensed amount, and total price.

Process 300 continues with determining whether the fueling session is complete (operation 352). If the fueling session is not complete, the process calls for continuing to dispense fuel (operation 344). If, however, the fueling session is complete, the process calls for returning to wait until a customer desires to initiate a fueling session (operation 304).

Although FIG. 3 illustrates one implementation of a process for fuel dispenser management, other processes for fuel dispenser management could include fewer, additional, and/or a different arrangement of operations. For example, a dispenser management process could include determining whether communication with a facility controller is available before determining that a customer desires to initiate a fueling session. As another example, a management process may place the module responsible for determining whether to dispense fuel in an active or inactive state before determining whether communication with a facility controller is available. Thus, the activation or deactivation of the module may not depend on the communication status of the facility controller. As a further example, a management process may generate and receive signals regarding a fueling session numerous times before, during, and/or after a fueling session. As an additional example, a management process may send data stored when communication with a facility controller was not available when communication with a facility controller is available.

FIG. 4 illustrates another implementation of a system 400 for fuel dispenser management. System 400 includes a store controller 410, external point-of-sale (POS) equipment 420, a fuel dispenser 430, and a POS link 444. System 400 could also include additional fuel dispensers, but one is sufficient for understanding system 400. Store controller 410 and external POS equipment 420 are interconnected with fuel dispenser 430 to control at least some of its operations.

Typically, a fuel dispenser within existing fueling facilities is dependent upon data transmitted to it from external POS equipment 420 over POS link 444 for initiating a fueling session. External POS equipment may, for example, be part of a facility controller. The transmitted POS data enables POS equipment 420 to control financial transactions and pump functions. In system 400, however, fuel dispenser 430 has the ability to perform at least some POS functions on its own. For example, fuel dispenser 430 may determine whether to accept a payment card, dispense fuel if the payment card is acceptable, and record data for completing the billing as the fueling session progresses. Thus, fuel dispenser 430 may, at least for an operationally-significant period of time (e.g., several hours), operate in an autonomous mode from external POS equipment 420, which provides robustness to system 400, as well as increased opportunity for fueling transactions for customers.

FIG. 5 illustrates a detailed view of one implementation of system 400. In this implementation, fuel dispenser 430 includes an in-dispenser POS module 431 that allows the fuel dispenser to conduct fueling sessions in a stand-alone mode if POS equipment 420 or POS link 444 should become inoperable. For example, POS module 431 may provide POS functionalities, which may include cash register, dispenser control, transaction card processing, and/or bar code scanning.

Store controller 410, POS equipment 420, and fuel dispenser 430 are coupled together via communication network 440. In this implementation, communication network 440 includes a hub 442 for distributing the communications between the components. POS equipment 420 generates customer activated terminal (CAT) and pump commands that are transmitted to fuel dispenser 430 through hub 442 via link 444. The commands may be represented by signals, structured messages, or other appropriate techniques by which to communicate information. Store controller 410 is linked with hub 442 via a communication link 446. System 400 also includes a diagnostic and asset management system 480, which, as illustrated here, can be located in the store or elsewhere at the fueling facility. Diagnostic and asset management system 480 is also coupled to hub 442 via communication link 446.

Fuel dispenser 430 includes a dispenser manager 432, a pair of VGA displays 433 including soft keys, and controllers 434 for managing peripheral elements or a bezel. Dispenser manager 432 or POS module 431 drives the content associated with the VGA display(s) 433 to provide interaction with a customer. Bezel controllers 434 provide for and control user inputs to fuel dispenser 430.

Fuel dispenser 430 also includes a dispenser computer 436. Dispenser computer 436 controls the fuel flow aspects of fuel dispenser 430. For example, dispenser computer 436 may control fuel-storage-tank submersible pumps and fuel control valves and monitor fuel flow information via metering and reporting sub systems, totals by grade, errors, and the like. Dispenser manager 431 interoperates with dispenser computer 436 to deliver commands and receive transaction data and status. For example, dispenser manager 432 may issue commands to dispenser computer 436 over an internal communication link 437 (e.g., a bus) of dispenser 430. Control, status, real-time diagnostic, error codes, and data may also be exchanged over communication link 437. In addition to controlling the fuel-flow aspects of the dispenser necessary to carry out fuel dispensing functionalities, dispenser computer 436 may also drive sale progress displays on sales/volume displays of dispenser 430. Dispenser manager 432 also collects and maintains status of fuel dispenser 430 and reports the status information to store controller 410 and/or POS equipment 420.

POS module 431 is associated with dispenser manager 432 within fuel dispenser 430 and provides a fault-tolerant architecture, assuring dispenser functionality in the event that POS equipment 420, HUB 442, or link 444 crashes, goes off-line, or otherwise become unavailable. To accomplish this, POS module 431 is operable to perform the relevant POS functionalities for operating fuel dispenser 430 in an autonomous mode for at least some operationally-significant period of time (e.g., two hours). These functionalities include, but are not limited to, store/forwarding, transaction logging, and URL and payment card processing. These functionalities may be a subset of the functionality necessary to operate a fuel dispenser on a longer-term basis, which may reside in POS equipment 420.

To assist it with its operation, POS module 431 accesses a number of databases 439 stored within a memory 438 of fuel dispenser 430. Databases 439 include data for operating POS module 431 in the stand-alone mode. This data could include, but is not limited to, URLs 439a or display content including customer instructional prompts, fueling status information, advertisements, various business rules 439b (including fuel prices, tender media authorization information, pump operational rules, etc.) for operation of the POS module, and completed transaction and error logs 439c.

System 400 provides a variety of features. For example, due to the networking and POS functionality available in the fuel dispenser, the system is able to be implemented with standardized networking technologies. Thus, distribution boxes, third-party interface boxes, and third-party POS intermediaries may be eliminated. Additionally, it provides the basis for an in-dispenser ordering kiosk.

Although FIG. 5 illustrates one implementation of system 400, other implementations of system 400 may include fewer, additional, or a different arrangement of components. For example, a system may not include a store controller. As another example, the POS equipment may be co-located with and/or part of the store controller. As a further example, a fuel dispenser may have a variety of configurations, as illustrated in FIGS. 6-8.

Figure 6:
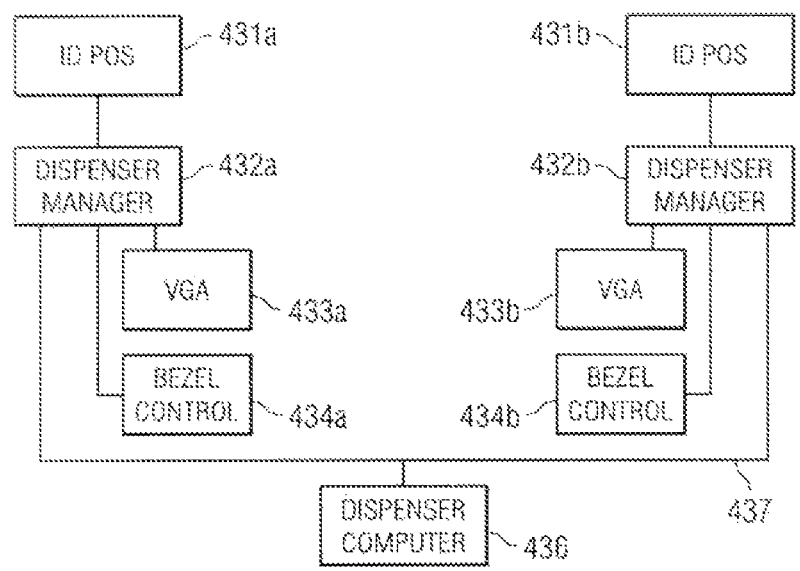
FIG. 6 is a block diagram illustrating a particular implementation of a fuel dispenser for the system of FIG. 4.

FIG. 6 illustrates a particular implementation of a fuel dispenser for system 400. The fuel dispenser in this implementation includes associated in-dispenser POS modules 431 and dispenser managers 432. The dispenser managers and the in-dispenser POS modules may, for example, be associated with different sides of the fuel dispenser. Dispenser managers 432 provide visual data to and receive indications of user input from respective displays 433 and controllers 434. Dispenser managers 432 may both communicate with dispenser computer 436 through communication link 437 for requesting fuel and receiving fuel-related data.

Figure 7:
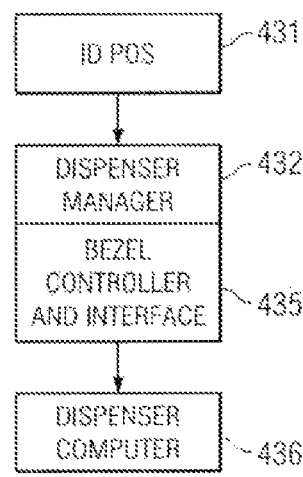
FIG. 7 is a block diagram illustrating another implementation of a fuel dispenser for the system of FIG. 4.

FIG. 7 illustrates another implementation of a fuel dispenser for system 400. The fuel dispenser in this implementation includes a bezel controller and interface 435 for receiving input to the fuel dispenser. The bezel controller and interface provides data to dispenser manager 432, which may provide appropriate data to in-dispenser POS module 431. Dispenser manager 432 may communicate with dispenser computer 436 through bezel controller and interface 435.

Figure 8:
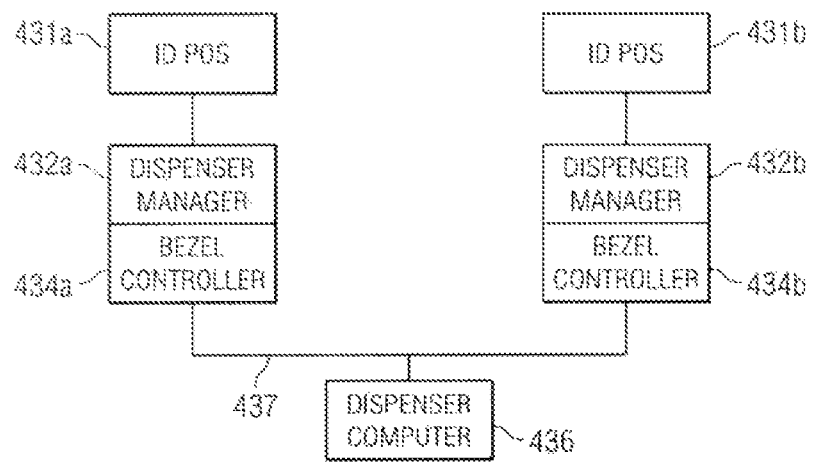
FIG. 8 is a block diagram illustrating still another implementation of a fuel dispenser for the system of FIG. 4.

FIG. 8 illustrates still another implementation of a fuel dispenser for system 400. The fuel dispenser in this implementation includes associated in-dispenser POS modules 431 and dispenser managers 432. The dispenser managers and the in-dispenser POS modules may, for example, be associated with different sides of the fuel dispenser. Dispenser managers 432 receive indications of user input from respective controllers 434. Dispenser managers 432 may both communicate with dispenser computer 436 through communication link 437, for requesting fuel and receiving fuel-related data.

Figure 9:
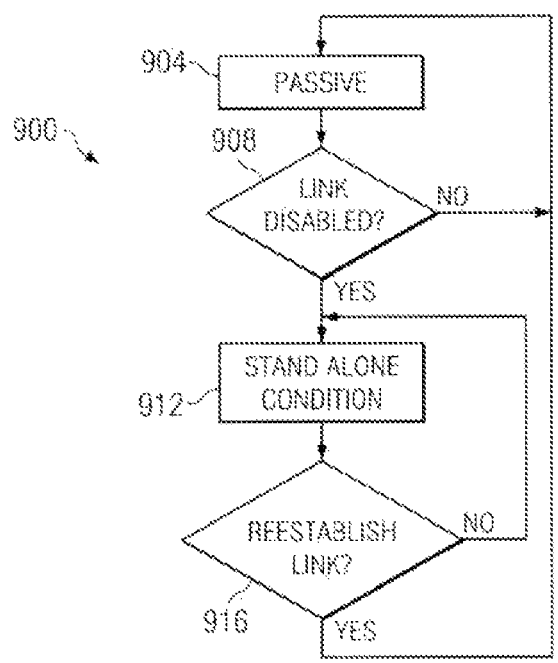
FIG. 9 is a flow chart illustrating one example of a process for fuel dispenser management.

FIG. 9 illustrates one example of a process 900 for fuel dispenser management. In particular, process 900 is an example of a process for operating a POS module such as POS module 431. In process 900, POS module 431 remains in a passive condition while external POS equipment is operating in normal application mode (operation 904). However, once it is determined that the link with the external POS equipment is unavailable (operation 908), the POS module begins to operate in a stand-alone condition (operation 912) until it is determined that the link with the external POS equipment has been re-established (operation 916). After the link is re-established, the POS module returns to the passive condition (operation 904).

Although FIG. 9 illustrates one implementation of a process for operating a POS module, other processes for operating a POS module may include fewer, additional, and/or a different arrangement of operations. For example, a POS module may operate on a full time basis. This could provide for a scaled-back version of the facility controller described with respect to FIG. 1, since most POS functionalities could be handled by the fuel dispenser. As another example, the POS module may be commanded to operate while the external POS equipment is to be taken offline, for repair or replacement. Thus, a POS module could be proactively engaged to support fueling facility operations.

Figure 10:
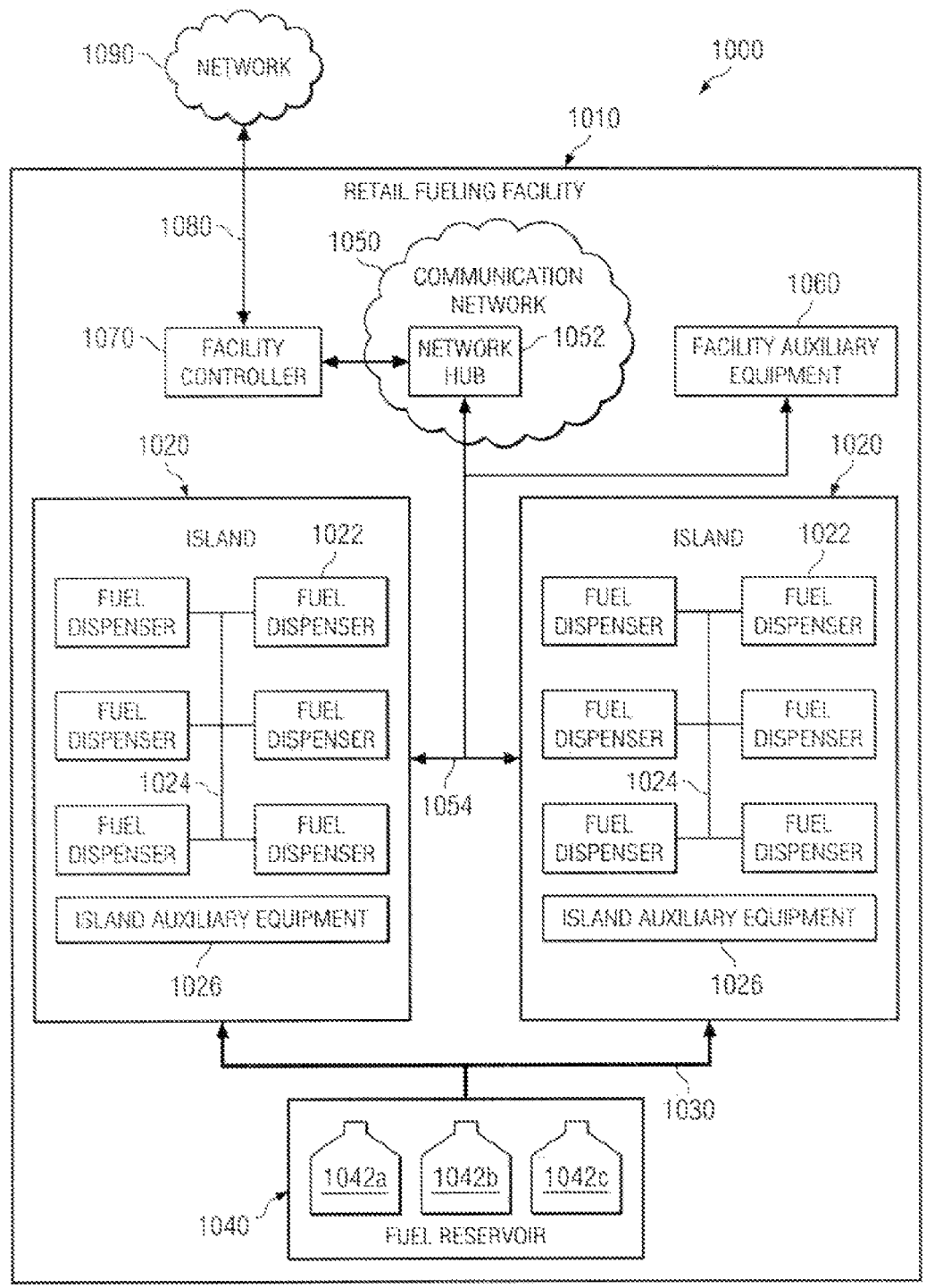
FIG. 10 is a block diagram illustrating one implementation of a retail fueling facility system having fuel dispenser management.

FIG. 10 illustrates an implementation of a retail fueling facility system 1000 having fuel dispenser management. System 1000 includes a retail fueling facility 1010 that includes two islands 1020, each of which encompasses six fuel dispensers 1022. Fuel dispensers 1022 are operable to dispense fuel received via a fluid conduit 1030 from a fuel reservoir 1040. Fluid reservoir 1040 includes storage tanks 1042a, 1042b, 1042c that may store fuels of different types or grades. While the foregoing components provide an infrastructure for dispensing fuel to customers of a retail fueling facility, in various implementations, the number and arrangement particulars of islands 1020, fuel dispensers 1022, fuel reservoir 1040, and storage tanks 1042, for example, may be varied or otherwise adapted for specific implementations.

Fuel dispensers 1022 provide a man-machine interface for facilitating a fuel dispensing session. Fuel dispensers 1022 are described in more detail with reference to FIGS. 11-12. Fuel dispensers 1022 on an island 1020 are coupled to communicate information via a communication link 1024 that is local to the island. In various implementations, communication link 1024 may be implemented using any suitable combination of physical or non-physical links that provide a path for conveying information. For example, the communication link may be a wired (e.g., unshielded twisted pair (UTP), coaxial cable, or fiber optic cable) and/or a wireless (e.g., RF or IR) link layer and may use any suitable standard or proprietary communication protocols and interfaces (e.g., HTTP, TCP/IP, Bluetooth, wireless local area network (WLAN), controller area network (CAN), RS-485, RS-232, universal serial bus (USB), or Ethernet). Communication link 1024 may include any appropriate collection of devices (e.g., wires, cables, hubs, transceivers, routers, repeaters) for conveying data and may, in some instance, be a communication network. In some implementations, communication link 1024 provides for communicating messages among fuel dispensers 1022 on an island 1020. In various implementations, one or more of fuel dispensers 1022 may be configured to generate messages that, when received by one or more other fuel dispensers 1022 via communication link 1024, cause the receiving fuel dispenser(s) to perform operations in substantial coordination with one or more fuel dispensers.

Each island 1020 also includes island auxiliary equipment 1026 that generally provides functionality that is specific to each island 1020 and that supplements the basic fuel dispensing functions of the island. Island auxiliary equipment 1026 may optionally be controlled by commands, such as commands generated by one of the fuel dispensers in the same island. Examples of auxiliary equipment that may be configured to operate at least partially dedicated to a particular island 1020 include communication equipment (e.g., intercom), audio and/or video recording or playback systems, diagnostic equipment, such as fuel spill detectors, emergency fuel shut-off controls, theft deterrent systems, surveillance equipment, lighting, and proximity detection equipment to detect the presence and/or location of vehicles near the island. Other equipment that may be at least partially dedicated to operations specific to an island 1020 may also be included in the auxiliary equipment 1026 for a particular island 1020.

In this implementation, islands 1020 may coordinate their operations by communicating via a communication link 1054. Communication link 1054 may be configured to convey messages sent by a fuel dispenser 1022 in one of islands 1020 to equipment, such as one or more of the fuel dispensers 1022, in the other island 1020. In various implementations, communication link 1054 may be implemented using any suitable wired and/or wireless link layer and may use any suitable standard or proprietary communication protocols and interfaces. Communication link 1054 may include any appropriate collection of devices (e.g., wires, cables, hubs, transceivers, routers, repeaters) for conveying data and may, in some instance, be a communication network. In some implementations, communication link 1054 may be part of, or otherwise integrated with, a communication network that includes communication link 1024.

Communication link 1024 and communication link 1054, respectively, may provide a link for transporting messages among fuel dispensers 1022 within an island 1020 and/or among islands 1020. For example, a fuel dispenser 1022 may communicate messages relating to its operation with one or more fuel dispensers 1022 in the same island 1020 or with one or more particular fuel dispensers in another island 1020. These messages may include requests for the receiving fuel dispenser 1022 to perform some service or operation. In this way, a fuel dispenser 1022 in one island 1020 may communicate messages to coordinate its operation with fuel dispensers 1022 in the same island and/or in another island.

Fuel dispensers 1022 may communicate with each other in order to perform a variety of operations in a coordinated manner. For example, if a fuel dispenser 1022 detects a fault condition (e.g., a fuel leak or fluid in the pan), the fuel dispenser may coordinate an appropriate response with one or more other fuel dispensers 1022. Other conditions that may trigger a need for coordination include receiving a message from a remote device (e.g., to perform a diagnostic function), loss of communication with a central computer, detection of a potential drive-off situation, and failure of a user-interface device.

Examples of operations that the coordinating fuel dispensers 1022 may perform include: capturing image data from different vantage points using image capture equipment controlled by the fuel dispensers, such as when a possible drive-off (without payment) situation is detected or a fuel leak is detected; providing user interface functionality for malfunctioning fuel dispensers; activating a shut-down state in which fuel dispensing is suspended, such as when a possible fuel leak or spill is detected; re-booting the controller in a fuel dispenser, such as when a processing fault occurs; and redundant storage of data in multiple fuel dispensers to provide for information recovery in the event of data loss. Coordinated operations may be used to provide any of a number of services for a fuel dispenser as an individual entity or for two or more fuel dispensers as a group.

One example of coordinated operation involves back-up user interface services. Fuel dispensers may require back-up user interface services, for example, when a printer (e.g., due to lack of paper or printer malfunction) or a card reader in a fuel dispenser is out of service. In cases where a fuel dispenser has a faulty printer, for example, the fuel dispenser may complete a fuel-dispensing session by sending a request to an alternate nearby fuel dispenser to print-out a transaction receipt. This is just one example that demonstrates how fuel dispenser coordination may improve the available "up-time" of fuel dispensers, reduce costs, and enhance the quality of service perceived by customers.

The appropriate fuel dispensers for coordinating operations may be predesignated. For example, if a fuel dispenser determines that an image needs to be captured of a vehicle to which it is dispensing fuel, it may already have the identity of one or more fuel dispensers that are able to capture such images. As another example, if a fuel dispenser's user interface (e.g., printer) is not working, the fuel dispenser may have its user interactions (e.g., receipt printing) performed by a nearby fuel dispenser.

Yet another example of coordinated operation relates to interactive health monitoring and diagnostic testing among fuel dispensers. In some implementations, an idle fuel dispenser may initiate a communication session to monitor the health of one or more other fuel dispensers by exercising communication interfaces, exercising processing functions, and verifying the integrity of stored information. For example, an initiating fuel dispenser may perform various predetermined health status checks on a second idle fuel dispenser. The initiating fuel dispenser may further receive and record the results and responses from the second fuel dispenser.

As an illustrative example, the fuel dispenser that initiates a diagnostic test may verify that the recorded volume of fluid dispensed by the second fuel dispenser falls within an expected range. The expected range may be based on recorded transactional information and the time elapsed since the previous diagnostic check. If the recorded value of fuel dispensed falls outside of an expected range, then the initiating fuel dispenser may indicate, for instance, that an equipment or operational fault (e.g., fuel leak, memory error, or meter fault) has occurred. Such diagnostic health checks may be performed at regular intervals, during idle times, such as when not engaged in a fuel dispensing transaction, or in response to a command input by a user. Accordingly, some implementations may provide for coordinated operation of fuel dispensers to quickly detect and accurately identify fuel dispenser problems at an early stage.

In the event that the diagnostic results deviate from expected results or are out of permitted tolerances, the initiating fuel dispenser may be configured to initiate corrective action. Examples of possible corrective actions include: rebooting the controller on the second fuel dispenser; sending a command instructing the second fuel dispenser to display, on its user interface, a message to indicate that functionality is currently limited or modified (e.g., "This printer is currently out of service. Your receipt will be printed at fuel dispenser #4." or "Credit card reader is currently out of service. Please swipe your credit card at fuel dispenser #8, or see the cashier."); and generating a maintenance request message to trigger maintenance of the second fuel dispenser.

Certain implementations may require fuel dispensers to authenticate themselves to each other before coordinated operations can take place. Authentication may take place through any appropriate technique. For example, a message-generating fuel dispenser may include an identifier and password in a message to a service-providing fuel dispenser. The authentication may take place on a message-by-message, transaction-by-transaction, or session-by-session basis.

In other implementations, fuel dispensers 1022 may not be arranged in groups of islands 1020. Thus, the illustrated implementation has been used in a non-limiting manner to describe coordination among a number of fuel dispensers located in and around a retail fueling facility by communicating messages over a communication link to transport messages among the fuel dispensers.

In addition to transporting messages among fuel dispensers of different islands 1020, communication link 1054 of this example implementation is also coupled to a communication network 1050, which includes a network hub 1052, and facility auxiliary equipment 1060. Network hub 1052 may provide message distribution services, for example, for messages sent in packets or frames over communication link 1054. In alternative implementations, islands 1020 and/or fuel dispensers 1022 may be arranged in a hub-and-spoke structure around hub 1052, or they may be arranged in a ring, a hierarchical, or a daisy-chain network configuration, for example. In some implementations, for instance, a message may have to traverse one or more intermediate fuel dispensers to reach its destination. Communication link 1054 also transports messages, such as commands, data, or control signals, between hub 1052 or the islands 1020 and facility auxiliary equipment 1060.

Facility auxiliary equipment 1060 generally provides functionality that is not specific to a particular island 1020 but supports functionality for retail fueling facility 1010. Facility auxiliary equipment 1060 may be controlled by commands, such as commands generated by one of the fuel dispensers 1022. Examples of facility auxiliary equipment 1060 include communication equipment (e.g., intercom), audio and/or video recording or playback systems, diagnostic equipment, such as fuel spill detectors, emergency fuel shut-off controls, theft deterrent systems, surveillance equipment, lighting, and proximity detection equipment to detect the presence and/or location of vehicles near the island 1020, for example.

Network hub 1052 is also configured to distribute messages from a facility controller 1070. Facility controller 1070 may include a computing system, such as a client connected to a remote server (not shown) through a communication link 1080 coupled to a communication network 1090 that is external to the retail fueling facility 1010. In some implementations, communication link 1080 may transport packets of information in digital format over wired, fiber optic cable, or wireless channels, including, for example, UTP, phone line, T-1, ISDN, and the like. Network 1090 may be implemented in a network system such as, for example, a VPN (virtual private network), WAN (wide area network), WLAN (wireless local area network), IEEE 802.16 Wireless MAN (wireless metropolitan area network), or the Internet. In other implementations, facility controller 1070 may include a stand-alone computing system, such as a PLC (programmable logic controller), laptop, desktop, or handheld computer that may or may not be connected to an external network, such as network 1090. In other implementations, fuel dispensers 1022 may communicate with a computer remote from system 1000 through facility controller 1070 or through another route, perhaps by communicating with a communication network outside of facility 101 0.

Via network hub 1052, facility controller 1070 may send messages related to coordinated operation to one or more of fuel dispensers 1022. The messages may include program instructions or information such as control signals or data. The program instructions may, for example, be stored in some or all of the fuel dispensers 1022 to configure the fuel dispensers to operate in a coordinated manner. Some implementations may provide for the fuel dispensers to execute the program instructions and perform coordinated operation without, or substantially without, additional information from the facility controller. Facility controller 1070 may also receive messages from fuel dispensers 1022 via hub 1052. Messages from the fuel dispensers may include, for example, status data, requests for maintenance, and data, such as quantities of fuel dispensed and recorded transaction information. The messages may further include data from auxiliary equipment 1026 or 1060, such as image and/or audio information. Some data may be passed between facility controller 1070 and fuel dispensers 1022 when the fuel dispensers are operating in service (i.e., on-line) or not in service (i.e., off-line). When the fuel dispensers are on-line, some data (e.g., data related to safety or theft) may be exchanged with the facility controller 1070 in real-time, while other data (e.g., updated program instructions, diagnostic results, etc.) may be exchanged at intervals.

Although an exemplary retail fueling facility 1010, which may sell retail gasoline and/or diesel fuels for general-purpose vehicles (e.g., automobiles and/or trucks), has been described with reference to FIG. 10, other implementations may be deployed in other fuel dispensing applications, such as commercial, wholesale, or private fuel dispensing installations. Fuels that are dispensed may, for example, be for automotive, aviation, and/or marine vehicles.

Figure 11:
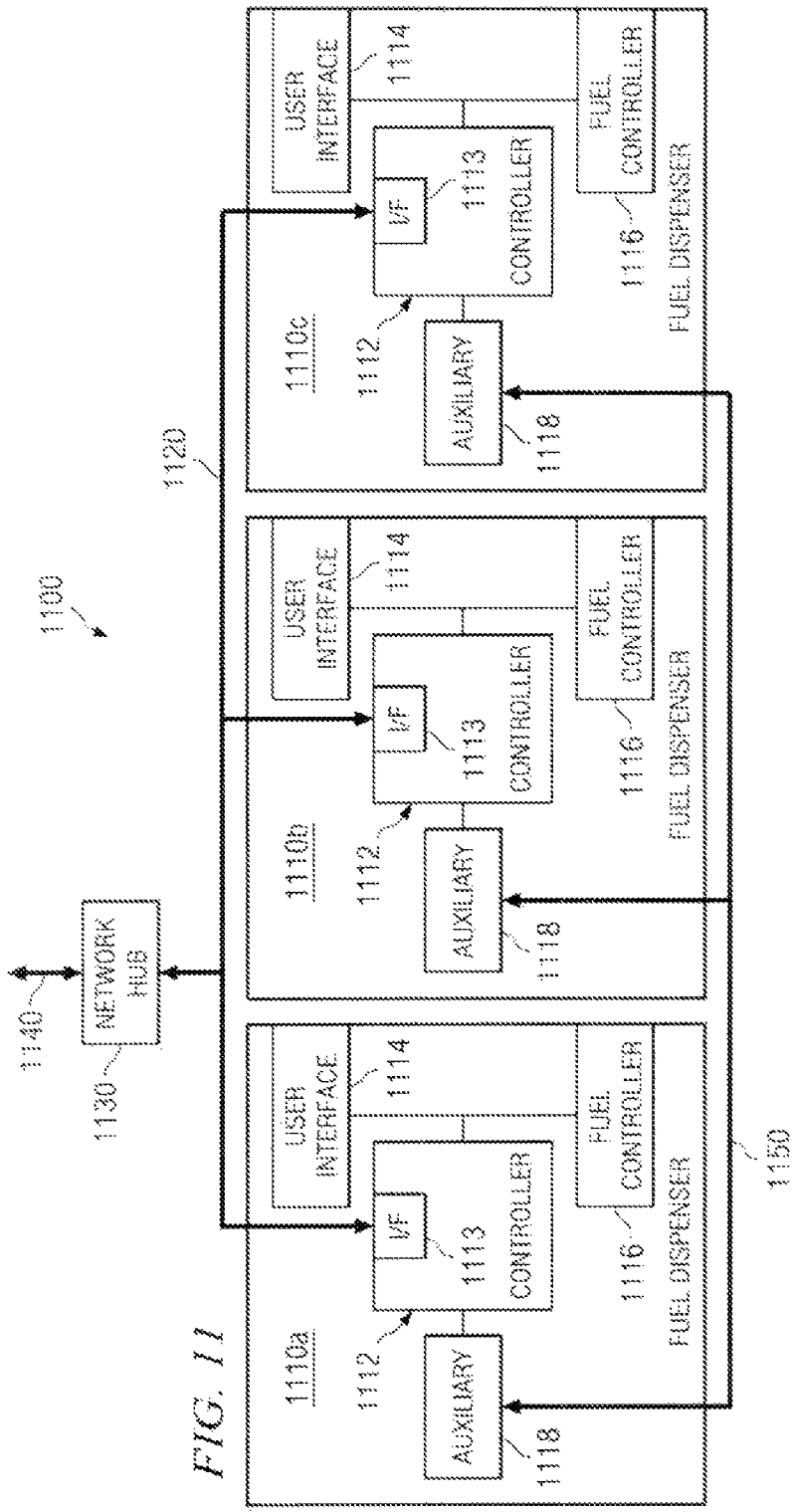
FIG. 11 is a block diagram illustrating an example network system for fuel dispensers.

FIG. 11 illustrates one implementation of a network system 1100 for fuel dispensers. Using network system 1100, fuel dispensers 1110 may communicate messages to coordinate their operations. As illustrated, network system 1100 includes three fuel dispensers 1110 that may communicate with each other to perform operations in a coordinated manner.

Each of fuel dispensers 1110 includes a controller 1112 that has a network interface 1113. Controllers 1112 are each coupled to a user interface (UI) 1114, a fuel controller 1116, and auxiliary equipment 1118. Aspects of an exemplary fuel dispenser will be described in further detail below with reference to FIG. 12.

In this implementation, fuel dispensers 1110 may communicate with each other over a communication link 1120 that is coupled to each fuel dispenser's network interface 1113 (e.g., network interface card). Communication link 1120 may connect fuel dispensers 1110 in a network, such as a LAN. Also in this example, communication link 1120 is coupled to a hub 1130, which may provide message distribution services as well as an interface to another communication link 1140. Hub 1130 may distribute messages among fuel dispensers and/or between the fuel dispensers 1110 and communication link 1140, which may convey messages to a facility controller and/or other fuel dispensers.

In addition to, or instead of, communication link 1120, fuel dispensers 1110 may communicate with each other over a communication link 1150. In this implementation, communication link 1150 is coupled to each fuel dispenser 1110 via a communication interface (e.g., RS-232) associated with auxiliary equipment 1118. Communication link 1150 may include wired and/or wireless links. Communication link 1150 may provide a channel dedicated to communicating information among fuel dispensers 1110, in that it may not directly transport messages between network hub 1130 and fuel dispensers 1110.

In one illustrative example, controller 1112 in fuel dispenser 1110b may generate a service request message to be sent to the fuel dispensers 1110a, 1110c via communication link 1120 and respective network interfaces 1113. The receiving fuel dispensers 1110a, 1110c may respond to the service request message by performing one or more operations. The receiving fuel dispensers 1110a, 1110c may simply listen for the messages from fuel dispenser 110b, or they may interactively communicate with fuel dispenser 1110b. If configured to listen for the messages, the respective controllers 1112 may perform operations, for example, as computational bandwidth and resources become available (e.g., low priority interrupt), immediately upon receipt (e.g., non-maskable interrupt), at predetermined times of day, in response to predetermined inputs, or during regularly scheduled times for servicing such requests. If configured to interactively listen for and respond to the messages from fuel dispenser 1110b, fuel dispensers 1110a, 1110c may perform operations in a predetermined sequence, for example, in which a fuel dispenser may wait to perform some operations until it receives a message that indicates that a preceding operation has been performed by another fuel dispenser.

Figure 12:
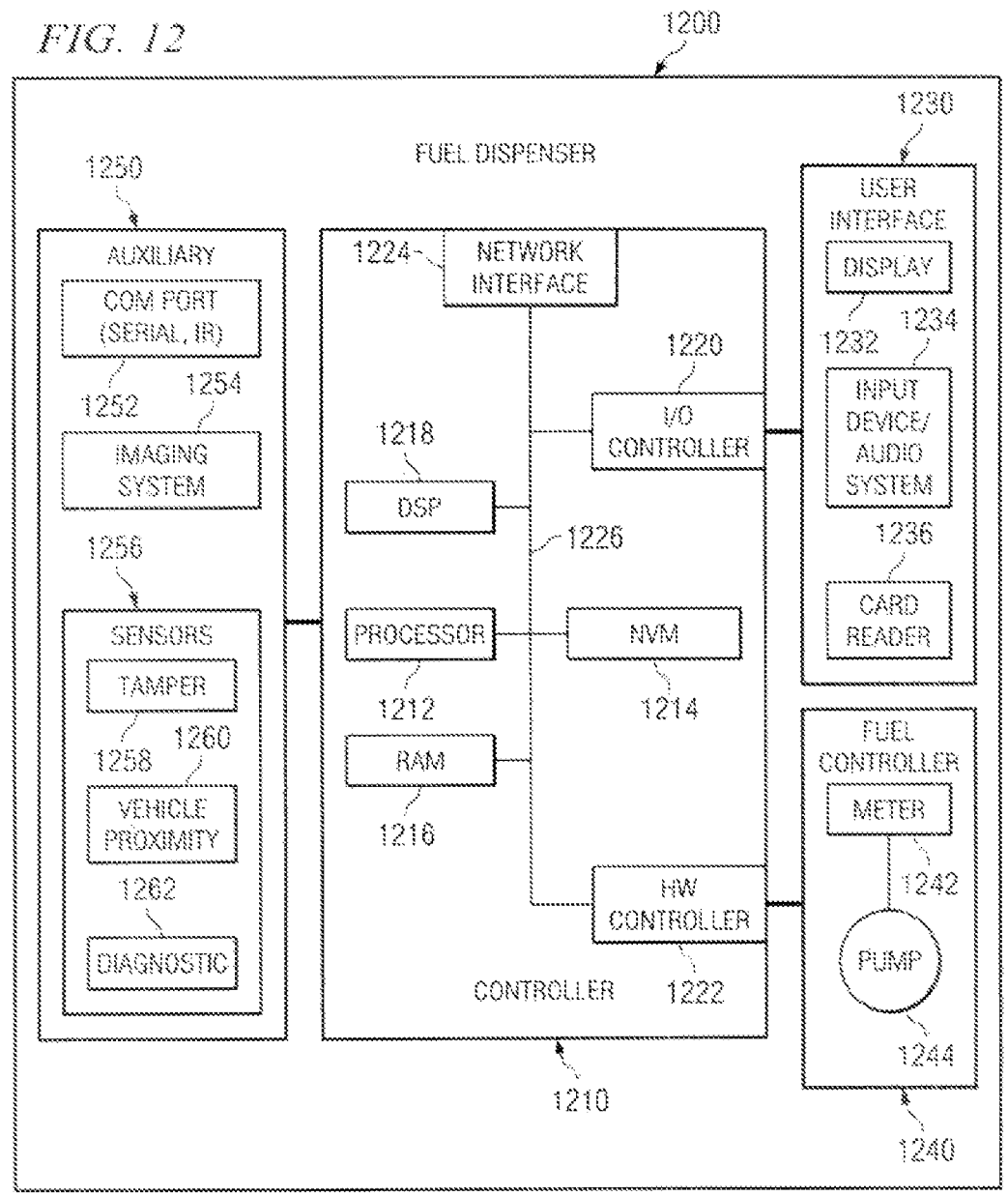
FIG. 12 is a block diagram illustrating one example of a fuel dispenser for fuel dispenser management.

FIG. 12 illustrates one implementation of a fuel dispenser 1200 for fuel dispenser management. Fuel dispenser 1200 may be one example of fuel dispensers 1110. The components of fuel dispenser 1200 may be involved in the communication of network messages and/or performance of fuel dispensing operations. Fuel dispenser 1200 includes a controller 1210 that has a network interface 1224, a user interface (UI) 1230, a fuel controller 1240, and auxiliary equipment 1250. Controller 1210 may, for example, be a special-purpose or general-purpose computer.

Controller 1210 provides the local intelligence for communications and operation of the fuel dispenser 1200, including operations that may be coordinated with one or more other fuel dispensers. Controller 1210 includes a processor 1212, such as a microprocessor, microcontroller, programmable logic device, or other appropriate device for manipulating information in a logical manner. Processor 1212 is coupled to a bus 1226 that enables processor 1212 to exchange information with peripheral or support devices, including an NVM (non-volatile memory) 1214, a RAM (random access memory) 1216, a DSP (digital signal processor) 1218, an HW (hardware) controller 1222, an I/O (input/output) controller 1220, and a network interface 1224. NVM 1214 provides non-volatile data storage, and may include a computer program product containing stored instructions that, when executed by the processor 1212, causes the processor to perform operations (as described in this document) in a coordinated manner with two or more other fuel dispensers. The computer program product may, for example, be a module that operates in association with a dispenser manager, which may be part of or in the controller 1210. The dispenser manager, for example, may be a computer program product that is also in NVM 1214 and/or a combination of components of controller 1210, (e.g., processor 1212, HW controller 1222, I/O controller 1220, and/or network interface 1124). RAM 1216 may provide volatile data storage that the processor may use, for example, as a scratchpad. DSP 1218 may allow fuel dispenser 1110 to perform computationally intensive operations in a coordinated manner, such as video or audio recognition or synthesis.

In one example, DSP 1218 may process a large data set including video image data, and may be used detect when a vehicle is proximate the fuel dispenser 1200. If, for example, DSP 1218 determines that the vehicle has moved away from the fuel dispenser, and processor 1212 determines that payment has not been received for fuel that has been dispensed, steps may be taken to record a potential drive-off situation. The fuel dispenser that detects the potential drive-off situation may, for example, send messages to other fuel dispensers with control over imaging equipment to try to capture images of the event. The request may specify a time delay for a particular camera to record images at a particular angle so as to increase the likelihood of capturing identifying information about the driver and the vehicle, for instance.

User interface 1230 is coupled to controller 1210 through I/O controller 1220. In this example, UI 1230 includes a display device 1232, an input device with audio system 1234, and a card reader 1236, to read debit and credit cards. UI 1230 may further include a printer (not shown) to provide a transaction receipt to customers who wish to pay for the transaction using, for example, a payment card.

Fuel controller 1240 is coupled to controller 1210 through HW controller 1222. Fuel controller 1240 includes a meter 1242 and a pump 1244. The meter measures, for example, the amount of fluid dispensed, which the controller 1210 may use to determine the amount of fuel dispensed in a particular transaction, for instance. Fuel pump 1244 pumps fuel to be dispensed from a fluid conduit.

Auxiliary equipment 1250 is also coupled to controller 1210. In this implementation, auxiliary equipment 1250 includes a communication (COM) port 1252, which may use, for example, a serial port. COM port 1252 may couple to a serial bus, such as the communication link 1150 in FIG. 11.

Auxiliary equipment 1250 also includes an imaging system 1254 and a set of sensors 1256. Imaging system 1254 may control one or more cameras associated with the fuel dispenser, and these may be used in a coordinated manner to detect and identify a potential drive-off, as has been described above. Imaging system 1254 may capture still or motion images. Sensors 1256 include a tamper sensor 1258, a vehicle proximity sensor 1260, and diagnostic equipment 1262.

Imaging system 1254 may also be used to capture data before a drive-off event occurs. For example, depending on conditions (e.g., after 10:00 pm and/or no pre-dispensing customer identification), the imaging system may image a customer and/or vehicle during a fueling session. With the use of motion determining equipment, (e.g., DSP 1218), it may also be possible to begin imaging before a fueling session begins, which may increase the chance of capturing identifying data (e.g., the vehicle's license plate). If the customer later pays for the dispensed fuel, the fuel dispenser may erase the image(s) from its memory. If, however, the customer does not pay for the fuel within a predefined period of time (e.g., ten minutes), the fuel dispenser may convey to images to a remote computer to generate a report for the authorities or generate the report itself.

The fuel dispenser may also coordinate with other fuel dispensers to capture image data before, during, or after the fueling session. This image data may increase the likelihood of capturing identifying data. This image data may be sent to the requesting fuel dispenser where it may be stored and later erased or conveyed. The data may also be temporarily stored at the imaging dispenser(s) until the fuel dispenser in use decides whether or not the image data is useful. The fuel dispenser in use may then inform the assisting fuel dispenser(s) as to whether to erase or convey the image data.

Imaging system 1254 may also capture images of physical conditions around the fuel dispenser. For example, images regarding the ground may be useful for determining whether a fuel leak is occurring, and images of the fuel dispenser itself may be useful for determining whether the fuel dispenser has been improperly accessed (e.g., open access panel). Imaging of the physical conditions around the fuel dispenser may also be accomplished with imaging systems of other fuel dispenser to provide additional image data of the fuel dispenser and its environment. The fuel dispenser may coordinate this imaging. The image data may be stored locally at the fuel dispenser and/or sent to a remote site, such as, for example, a service provider's computer.

Imaging system 1254 may additionally be used for providing customer-service. For example, the imaging system may image the area in the vicinity of the fuel dispenser so that a store attendant or other person knowledgeable with the functioning of the fuel dispenser may assist a customer.

Diagnostic sensors 1262 may also be used in a coordinated manner. For example, if a fuel dispenser detects a problem with itself or its environment, it may contact other fuel dispensers to determine if they are detecting similar problems. If, for instance, only the initiating fuel dispenser is experiencing a problem, it may take appropriate measures to alleviate the problem (e.g., restarting, redistributing one or more of its operations, or shutting down). If all the fuel dispensers are experiencing the same problem, however, they may all need to reset and/or shut down.

Figure 13:
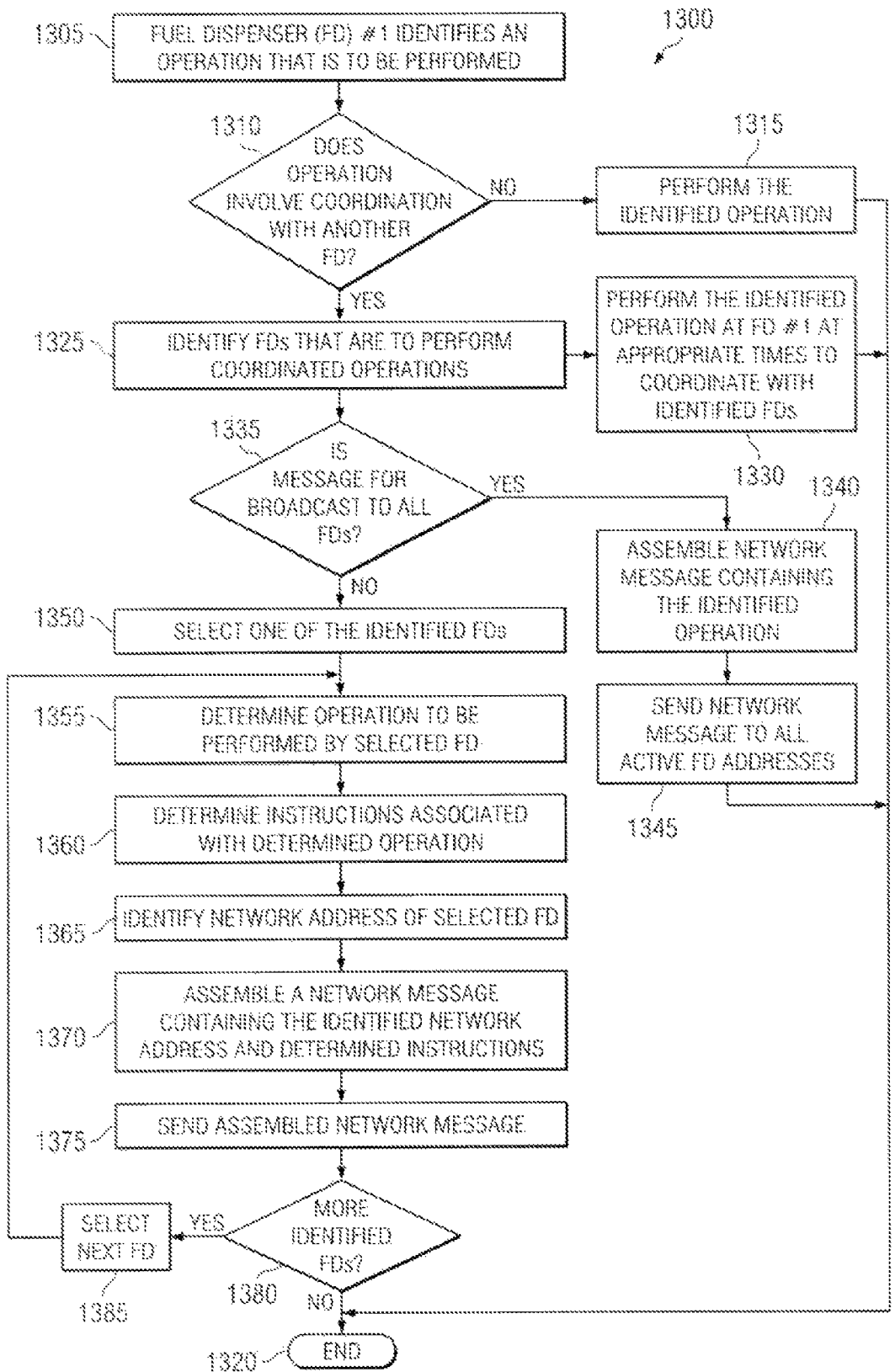
FIG. 13 is a flow chart illustrating one example of a process for coordinating fuel dispensers.

FIG. 13 illustrates a process 1300 for managing a fuel dispenser. Process 1300 generally illustrates a process for coordinating operations between fuel dispensers and may illustrate the operations of one or more of the above-described fuel dispensers. In particular, the process may be implemented by a management module for a fuel dispenser.

Process 1300 begins with a fuel dispenser (FD #1) identifying at least one operation to be performed (operation 1305). The operation(s) may be identified, for example, in response to the occurrence of a condition, such as the presence of an input signal (i.e., a user command), a sensor input (e.g., detection of a potential drive-off), or receipt of a message from another fuel dispenser (i.e., the message contains a request that FD #1 perform the operation(s)). FD #1 then evaluates whether the identified operation(s) involve coordination with at least one other fuel dispenser (operation 1310). If it does not, FD #1 performs the identified operation(s) (operation 1315), and the process ends (operation 1320). However, if the identified operation does involve such coordination, FD #1 identifies which fuel dispensers are to perform the coordinated operations (operation 1325).

Next, the process bifurcates into two parallel paths. On one path, FD #1 performs any identified operations at appropriate times that are coordinated with the operations being performed by the other fuel dispensers (operation 1330). In some examples, FD #1 may not have any operations to perform, in which case this portion of the process is at an end (operation 1320).

On the other path, FD #1 evaluates whether a message containing the coordination request will be broadcast to all other fuel dispensers (operation 1335). A message may be broadcast, for example, if the identified operation is to be performed by all available fuel dispensers. If a message will be broadcast, FD #1 assembles a network message containing the identified operation (operation 1340) and sends the network message to all active fuel dispenser network addresses (operation 1345). If the message will not be broadcast, FD #1 selects a first one of the identified fuel dispensers (operation 1350), determines the operation to be performed by the selected FD (operation 1355), and determines the instruction(s) to be performed by the selected fuel dispenser (operation 1360). The determined instructions may include one or more commands that prompt the selected fuel dispenser to perform the determined operations when the instructions are received. The instructions may also include data for the selected fuel dispenser to use in performing the operation. FD #1 then identifies a network address of the selected FD (operation 1365) and assembles a network message containing the identified network address and the determined instruction(s) (operation 1370). FD #1 sends the assembled network message over the network (operation 1375). If the determined operations for the selected fuel dispenser have a long length or include multiple commands, more than one network message may be sent. In coordination with operations performed by the selected fuel dispenser, FD #1 may continue to perform operations, if any, at appropriate times (operation 1330).

After sending the network message, FD #1 determines whether any identified fuel dispensers have not yet been sent a network message (operation 1380). If there are more identified fuel dispensers, FD #1 selects another fuel dispenser (operation 1385), and the process of forming and sending a message for the fuel dispenser (operations 1355-1375) begins again. However, if no other fuel dispensers have been identified, the process ends (operation 1320).

The exemplary process of FIG. 13 involves identifying fuel dispensers to perform coordinated operations. Fuel dispenser #1, which is the message-generating fuel dispenser, may identify fuel dispensers using various techniques. For example, the operation to be performed may be linked to a set of fuel dispensers that have been identified as the fuel dispensers to perform coordinated operations. Such a link may be defined in a database, in a table, or in a list. In some implementations, the set of fuel dispensers identified may be static, such as information that is downloaded at system configuration time. In other implementations, the set of fuel dispensers associated with an identified operation may be dynamically determined. For example, the set of fuel dispensers identified may be calculated based on current conditions of fuel dispensers. In some circumstances, some fuel dispensers may have sufficient unused bandwidth to efficiently handle additional computational tasks and/or message traffic that may be required to perform the operations within the required time frame. Fuel dispensers that are currently idle, for example, may generally be more likely to be identified, presuming they are otherwise suitable to perform the coordinated operations. However, an idle fuel dispenser with an out-of-service video camera, for example, would not be eligible to be identified to perform an image capture operation of a possible drive-off event. Optimization algorithms, using techniques such as least-squared error and/or regression processes, may be developed for specific implementations to optimize the identification of fuel dispensers to perform coordinated operations.

Although one implementation of a process for fuel dispenser management has been described, other implementations may perform the operations in a different sequence or a modified arrangement to achieve the same primary function, which is to coordinate operations performed by two or more fuel dispensers.

In various implementations, fuel dispensers may communicate using suitable communication methods, equipment, and techniques. For example, the fuel dispensers 1022 (FIG. 10) may communicate from a source fuel dispenser to a destination fuel dispenser using point-to-point communication in which a message is transported directly from the source to the receiver over a dedicated physical link (e.g., fiber optic link, point-to-point wiring, daisy-chain). Other implementations may transport messages by broadcasting to all or substantially all fuel dispensers that are coupled together by a communication network, for example, by using omni-directional radio frequency (RF) signals, while still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, RS-232, RS-422, RS-485, 802.11 a/b/g, Wi-Fi, Ethernet, IrDA, FDDI (fiber distributed data interface), token-ring networks, or multiplexing techniques based on frequency, time or code division. Some implementations may optionally incorporate features such as error checking and correction (ECC) for data integrity, or security measures, such as encryption (e.g., WEP) and password protection.

In some implementations, each fuel dispenser may be programmed with the same data and be initialized with substantially identical data stored in non-volatile memory. In other implementations, one or more fuel dispensers in an installation may be custom configured to perform specific functions. For example, one fuel dispenser may be configured to perform routing functions by routing messages among fuel dispensers in an island or between fuel dispensers in different islands.

To establish communication, individual fuel dispensers may identify themselves over the network by sending a unique identifier. In other implementations, for example, a router, switch, or bridge may handle the flow of message traffic to enable messages to be routed to a specific destination fuel dispenser based on a network address, for example. Network messages may, for example, be structured in packets that include a header to identify a network address of a destination fuel dispenser and/or to identify the destination device as a particular type of fuel dispenser.

In addition, some implementations may permit communication in a broadcast mode, in which a message-generating fuel dispenser may send messages to be received by all other fuel dispensers in the same retail fueling facility or coupled to the same communication link or network. Various network arbitration methods, such as passing a token, for example, may be used to handle or avoid collisions when more than one fuel dispenser attempts to send a message at the same time.

Configuring fuel dispensers with the ability to coordinate their operations may provide one or more beneficial features. For example, allowing coordination between fuel dispensers may permit operations to continue in the absence or interruption of communications between a fuel dispenser and a central controller. Accordingly, fuel dispensing operations and other transactions at the fuel dispenser may continue during interruptions in the communication link to the central controller, such as during periods of maintenance, re-boots, or low bandwidth of the central controller, for example. In addition, coordination among fuel dispensers may provide expanded functionality, such as coordination among multiple fuel dispensers to operate cameras to capture images of non-paying customers (i.e., drive-offs) from multiple vantage points. Furthermore, customer service may also be enhanced by providing redundant equipment in the event of equipment problems. For example, if a receipt cannot be printed at one fuel dispenser station due to lack of paper, a receipt may be printed at a nearby fuel dispenser that is available. Still further, fuel dispenser coordination may provide for improved diagnostic capabilities to detect and accurately identify fuel dispenser problems at an early stage. Accordingly, fuel dispenser coordination may promote increased revenue and reduced losses, for example, by improving the availability (i.e., uptime) of fuel dispenser functions, expanding functional capabilities, promoting safety, and improving customer experiences.

Figure 14:
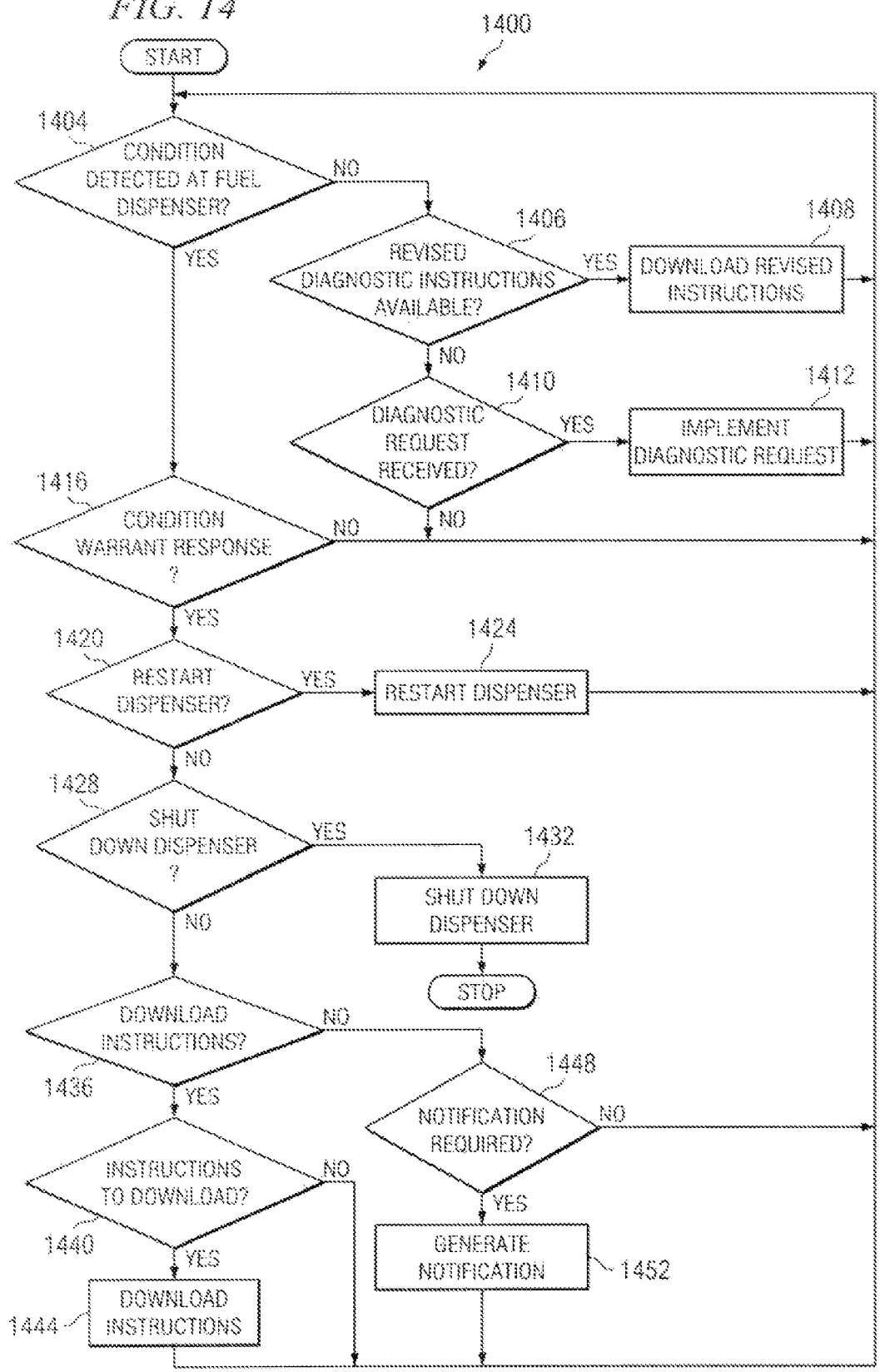
FIG. 14 is a flow chart illustrating another implementation of a process for managing a fuel dispenser.

FIG. 14 illustrates one example of a process 1400 for managing a fuel dispenser. Process 1400 generally relates to providing diagnostic services at a fuel dispenser. Process 1400 may, for example, be implemented by one or more of the above-described fuel dispensers.

Process 1400 begins with determining whether a condition has been detected at the fuel dispenser (operation 1404). Determining whether a condition has been detected at the fuel dispenser may, for example, be accomplished by determining whether one or more sensors have made a reading or one or more processors have made a condition determination. Conditions that could be detected include environmental, mechanical, electrical, and/or logical instruction conditions, such as, for example, temperature, pressure, humidity, fuel leaks, open panels, dispenser intrusion, power irregularities, watchdog timer expiration, or software exceptions. Condition determinations may be made on time-driven or event-driven basis.

If a condition has not been detected, process 1400 calls for determining whether revised diagnostic instructions are available (operation 1406). Determining whether revised diagnostic instructions are available may, for example, be accomplished by determining whether a message indicating that revised diagnostic instructions are available has been received or by generating a message inquiring whether revised diagnostic instructions are available. The instructions may, for example, be available from a remote server. If revised diagnostic instructions are available, process 1400 calls for downloading the revised diagnostic instructions (operation 1408). The fuel dispenser may, for example, enter into a client-server relationship to download the instructions. Once the revised instructions have been downloaded, process 1400 calls for again determining whether a condition has been detected at the fuel dispenser (operation 1404).

If, however, there are no revised instructions available, process 1400 calls determining whether a diagnostic request has been received (operation 1410). A diagnostic request may, for example, request data regarding or specify a diagnostic command for a fuel dispenser component (e.g., a dispenser manager, a fuel controller, or other appropriate fuel dispenser component). A diagnostic command may, for example, specify a soft reset, revised operational instructions (e.g., software), or any other appropriate command affecting the operation of the pump component. An interrogation command may, for example, include an identifier request, a status request, or any other appropriate request regarding information about a fuel dispenser component. A diagnostic request may be received from a fueling facility computer remote from the fuel dispenser (e.g., a facility controller) or any other appropriate device.

If a diagnostic request has been received, process 1400 calls for implementing the diagnostic request (operation 1412). Implementing a diagnostic interrogation request could, for example, include retrieving status data from a fuel dispenser component and providing the data to the requesting device. Implementing a diagnostic command request could, for example, include issuing a command to a fuel dispenser component. Once the diagnostic request has been implemented, or if no diagnostic request has been received, process 1400 calls for again determining whether a condition has been detected at the fuel dispenser (operation 1404).

If a condition has been detected at the fuel dispenser, process 1400 calls for determining whether the condition warrants a response (operation 1416). Whether a condition warrants a response may depend on whether the condition exists, the degree of the condition, and/or one or more other conditions. For example, the existence of some conditions (e.g., open panel, improper access, or fuel leak) may warrant a response. As another example, some conditions (e.g., temperature or jitter pulses) may have an acceptable range (e.g., 0-140° F. or jitter pulse less than once a week, respectively) in which the condition does not warrant a response. Whether a condition warrants a response may be expressed as one or more logical conditions in a set of logical instructions. If the condition does not warrant a response, process 1400 calls for determining whether another condition has been detected at the fuel dispenser (operation 1404). Data regarding the detected condition may be discarded or saved for later analysis or reporting.

If, however, a condition does warrant a response, process 1400 calls for determining whether the fuel dispenser should be restarted (operation 1420). The fuel dispenser may need to be restarted, for example, if power irregularities have been detected, if software exceptions occur, if watchdog timers expire, if communication within the dispenser fails, or if communication with the facility controller fails. An example of the last includes determining that a card reader is not receiving a polling message. Another example of the last includes determining when the fuel dispenser is not in an idle mode and it is trapped (e.g., waiting for a pre-authorization response). If the fuel dispenser needs to be restarted, process 1400 continues with restarting the fuel dispenser (operation 1424), which may include resetting certain components (e.g., rebooting processor-based components or resetting a communication line to the facility controller), powering down certain components, or powering down the entire fuel dispenser. Once the fuel dispenser has been restarted (a process that may take between approximately a few seconds to a couple minutes), process 1400 calls for determining whether another condition has been detected at the fuel dispenser (operation 1404).

If the fuel dispenser does not need to be restarted, process 1400 calls for determining whether the fuel dispenser should be shut down (operation 1428). The fuel dispenser may need to be shut down, for example, if a fuel leak, an electrical short, a fire, liquid (e.g., water) in the pan, improper vapor recovery, or unauthorized access is detected. The conditions may be detected by any appropriate sensors. If the fuel dispenser need to be shut down, process 1400 continues with shutting down the fuel dispenser (operation 1432). Shutting down the fuel dispenser may include placing mechanical components into safe positions, shutting down processor-based components, and removing power from electrical components. Once the fuel dispenser has been shut down, process 1400 is at an end.

If, however, the fuel dispenser does not need to be shut down, process 1400 calls for determining whether the fuel dispenser should download instructions (operation 1436). The fuel dispenser may need to download instructions if, for example, repeated error conditions occur (e.g., one or more watchdog timers continues to expire, one or more software exceptions continues to occur, a customer card read continues to fail, or the fuel dispenser has restarted itself a certain number of times in a given time period (e.g., three restarts in a three hour period)). The fuel dispenser may also need to download instructions if it detects that it is not operating in an efficient manner. For example, the fuel dispenser may monitor the flow rate of fuel. If the flow rate deviates from a designated range (e.g., between eight to ten gallons per minute), the fuel dispenser may adjust the valves to adjust the flow rate. Adjusting the valves may call for downloading appropriate instructions. Other operations of the fuel dispenser may be similarly adjusted.

If instructions need to be downloaded, process 1400 continues with determining whether there are appropriate instructions to download (operation 1440). Determining whether there are appropriate instructions to download may, for example, include generating an inquiry for or polling a remote computer (e.g., server). If there are appropriate instructions to download, process 1400 calls for downloading the instructions (operation 1444). The instructions may be in the form of a rule set, a portion of a rule set, a software application, a patch, or any other appropriate set of logical instructions. The instructions may be in the form of software or firmware updates. Once the instructions have been downloaded, or if there are no appropriate instructions to download, process 1400 calls for determining whether another condition has been detected at the fuel dispenser (operation 1404).

If, however, the fuel dispenser does not need to download instructions, process 1400 calls for determining whether a notification is required (operation 1448). A notification may, for example, be required if a facility controller, other fuel dispensers at the fueling facility, or other components, whether at the fueling facility or not, need to be notified of the condition. For example, if a leak in a trunk line (a type of fluid conduit) is detected, all of the fuel dispensers at the fueling facility may need to be notified that they need to shut down. As another example, if a parameter is out of tolerance (e.g., power level, flow rate, number of transactions per hour, or sales amounts) a remote and/or fueling facility device or person may need to be notified. If a notification is required, process 1400 continues with generating the notification (operation 1452). The notification may, for example, be a message directed to one or more other components at the fueling facility. Additionally, the message may be directed to a computer remote from the fueling facility. For example, a message (e.g., e-mail, SMS, or instant message) may be sent to a service provider and/or fuel dispenser manufacturer where it may be analyzed by a person or computer (e.g., PC, server, workstation, or PDA). The analysis may include condition analysis, diagnosis, and trending analysis. The message may or may not be sent through another fueling facility component. Once the notification has been generated, or if there is no notification required, process 1400 calls for determining whether another condition has been detected at the fuel dispenser (operation 1404).

The diagnostic services illustrated by process 1400 possess several features. For example, by being able to shut down only one fuel dispenser, a fueling facility may be able to continue operating when a problem that is localized to one fuel dispenser is detected. As another example, by being able to attempt to fix itself, a fuel dispenser may be able to resume operation without having to be serviced, which may increase its ability to dispense fuel. As a further example, by being able to process diagnostic interrogation and command requests, a fuel dispenser may be able to provide relevant diagnostic data regarding its operations and/or be controlled for diagnostic purposes. This may provide insight into the status of a fuel dispenser that is malfunctioning and provide techniques for correcting the problem(s).

The diagnostic service operations of process 1400 may be accomplished by any of a variety of hardware and/or software combinations. For example, the operations may be performed by a management module associated with a dispenser manager, as illustrated in FIG. 2, for example. In such implementations, the diagnostic operations may be expressed as instructions, and the diagnostic data may be stored in logs, especially if an attempted correction does not fix a condition. Such a management module may exclusively provide diagnostic services, with or without other management modules providing other services, or provide other services too (e.g., POS, fuel dispenser coordination, and/or data security).

In certain implementations, a fueling facility may include a gateway (e.g., a server) to provide a variety of services based on fuel dispenser diagnostics. For example, the gateway may provide local reporting, alerting, and routing. Alerts may, for example, be sent to: 1) a service center for reporting, alerting, or routing of service providers; and 2) a fuel dispenser manufacturer for reporting or alerting. As part of its operations, the gateway may discard data from fuel dispensers because it is irrelevant, forward data to other components for processing or storage, store data in a local database for later reporting or analysis, and generate alerts for mobile devices for reaction. The gateway may also act as an application and configuration (e.g., plug and play) server for fuel dispensers. The gateway may or may not be part of the facility controller.

A diagnostics manager may include the ability to issue diagnostic operation commands and/or interrogation commands to one or more fuel dispenser components. The diagnostics manager may, for example, be a software component that resides on the dispenser and/or on a remote fueling facility computer (e.g., a facility controller or a gateway). For communications to a fuel dispenser, a diagnostics manager may, for example, issue XML messages over TCP/IP. The fuel dispenser components (e.g., dispenser manager and management module) may also communicate using XML messages. Other appropriate messaging techniques, whether static, dynamic, or otherwise, and communication protocol schemes, whether local, regional, or global, may also be used. One or more of a fuel dispenser's components may have to be modified to have the ability to accept diagnostic operation commands and/or interrogation commands. For example, a component may have to be modified to respond to a diagnostic interrogation (e.g., for identifiers or status) and to a diagnostic command (e.g., to implement a soft reset or revised operational instructions). Modifications may include the ability to receive, recognize, and respond to the diagnostic requests.

Although FIG. 14 illustrates one example of a process for fuel dispenser management in which the fuel dispenser provides diagnostic services, other processes for fuel dispenser management in which the fuel dispenser provides diagnostic services may include fewer, additional, and/or a different arrangement of operations. For example, checking for revised diagnostic instructions may occur on a periodic basis (e.g., once a day). As another example, when a condition warrants a response, a process may implement a response without determining whether the response should be implemented. As another example, more than one response may be implemented in response to a condition. For instance, if the fuel dispenser detects an internal fuel leak, the fuel dispenser may shut itself down and notify other fuel dispensers that it is shutting down, or if a fuel dispenser detects a leak in a trunk line, the fuel dispenser may shut itself down and notify other fuel dispensers that they also should shut down. By being able to notify other fueling facility components of local conditions, a fuel dispenser may be able to increase the safety of the entire fueling facility. As a further example, one or more of the responses (e.g., restarting the fuel dispenser or shutting down the fuel dispenser) may not be implemented. As an additional example, a response may be based on previous response. For instance, if a given number of restarts have already occurred in a period of time (e.g., three in one day), the next time a condition that dictates a restart is detected, the fuel dispenser may try to download instructions before restarting again. Also, if the new instructions do not alleviate the excessive restart sequence, the fuel dispenser may revert back to its previous configuration. Additionally, if resetting a communication line does not resolve a problem, the communication board for the line may then be reset. As an additional example, a process may call for one or more operations to be performed contemporaneously (e.g., in an interleaved manner) or simultaneously (e.g., in a parallel manner).

In particular implementations, a fuel dispenser may be able to initiate a coordinated operation with another fuel dispenser as, or as part of, a response. The ability for fuel dispensers to coordinate operations was discussed above with respect to process 1300. For example, if a first fuel dispenser detects a fluid (e.g., gas) leak, it may request another fuel dispenser to take an image of the first fuel dispenser. The image may be stored by one of the fuel dispensers or sent to a remote device for storage. The first fuel dispenser may also request the recording of status data regarding the other fuel dispensers. Thus, if a service technician must become involved, she may have more information regarding the conditions at the fuel dispenser. Coordinated operations may also be used in conjunction with other responses. For example, a fuel dispenser that detects a fluid leak may request imaging and/or status data from another fuel dispenser and then shut itself down.

FIG. 15 illustrates another implementation of a process 1500 for managing a fuel dispenser. Process 1500 generally relates to providing data security at a fuel dispenser of a fueling facility. Process 1500 may be one example of a process performed at a fuel dispenser of fueling facility system 100.

Process 1500 begins with waiting for a fueling session to be initiated at a fuel dispenser (operation 1504). Determining whether a fueling session has been initiated at a fuel dispenser may, for example, be accomplished be detecting the presence of a customer identifier (e.g., insertion of an electromagnetic payment card (e.g., a credit card) or presence of a wireless payment authorizer (e.g., an RFID tag)), user interaction with a fuel dispenser input device (e.g., a keypad), the removal of a fuel dispenser pump handle, or any other appropriate indicator of customer interaction with a fuel dispenser.

Once a fueling session has been initiated at a fuel dispenser, process 1500 calls for waiting for a portion of transaction data for the fueling session to be received at the fuel dispenser (operation 1508). The transaction data portion may, for example, include a customer's account number, identification code, authorization code (e.g., PIN number), and/or purchase information. The data portion may be acquired at the beginning, middle, or end of a fueling session.

Once a portion of transaction data has been received, process 1500 calls for determining whether the data portion is to be stored at the fuel dispenser (operation 1512). A data portion may, for example, be stored at the fuel dispenser if it needs to be held for a certain time or event before being sent to a remote device or if a communication link is not available. In some implementations, a data portion may be stored at the fuel dispenser for a transitory period of time (e.g., a few nanoseconds to a few seconds) without it being considered as being stored at the fuel dispenser.

If the data portion is to be stored at the fuel dispenser, process 1500 calls for determining whether the data portion requires a security measure (operation 1516). A data portion may, for example, require a security measure if its type has been designated as a sensitive piece of information (e.g., a customer account number). If the data portion requires a security measure, process 1500 continues with encrypting the data portion (operation 1520). The encryption may be accomplished by any appropriate scheme (e.g., a public key or a private key scheme). Once the data portion has been encrypted, or if the data portion does not require a security measure, process 1500 calls for storing the data portion at the fuel dispenser (operation 1524). The data portion may, for example, be stored in a transaction log with other transaction data or in a separate portion of memory.

Once the data portion has been stored, process 1500 calls for determining whether the fueling session is finished (operation 1528). If the fueling session is finished, the process is at an end. A fueling session may be finished, for example, if a customer has stopped pumping fuel and completed the purchase of it. If, however, the fueling session is not finished, process 1500 calls for determining whether another portion of transaction data has been received at the fuel dispenser (operation 1508). The stored data portion may eventually be conveyed to a remote facility computer (e.g., a facility computer). The data portion may be conveyed in an encrypted or unencrypted format.

With reference again to operation 1512, if it is determined that a data portion is not to be stored at the fuel dispenser, process 1500 calls for determining whether the data portion is to be conveyed to a fueling facility computer (operation 1532). Data may, for example, need to be conveyed to a fueling facility computer if the data assists in completing a fueling session transaction (e.g., payment card data) or in monitoring the status of the fuel dispenser. Conveyance to a fueling facility computer may, for example, be a prefatory operation to conveyance to a computer remote from the fueling facility. The fueling facility computer may, for example, be a personal computer, a workstation, a server, or a router. If the data portion is not to be conveyed to a fueling facility computer, process 1500 calls for determining whether the fueling session is finished (operation 1528).

If, however, the data portion is to be conveyed to a fueling facility computer, process 1500 calls for determining whether the data portion requires a security measure (operation 1536). A data portion may, for example, require a security measure if its type has been designated as a sensitive piece of information (e.g., a customer account number). If the data portion requires a security measure, process 1500 calls for preparing the data portion for conveyance over a wireline link (operation 1540). Preparing the data portion for conveyance over a wireline link may, for example, include designating the data portion for communication over the wireline link, scheduling the data portion for communication over the wireline link, formatting the data portion in a communication protocol for the wireline link (e.g., by encapsulation or encoding), and/or sending the data portion over the wireline link. But if the data portion does not require a security measure, process 1500 calls for preparing the data portion for conveyance over a wireless link (operation 1544). Preparing the data portion for conveyance over a wireless link may be similar to preparing it for conveyance over a wireline link. After preparing the data portion for conveyance, process 1500 calls for determining whether the fueling session is finished (operation 1528).

Although FIG. 15 illustrates one implementation of a process for managing a fuel dispenser to provide fueling facility data security, other processes for managing a fuel dispenser to provide fueling facility data security may include fewer, additional, and/or a different arrangement of operations. For example, a process may not include determining whether a data portion to be stored at a fuel dispenser requires a security measure. As another example, a process may include conveying a data portion stored at the fuel dispenser to a fueling facility computer. Furthermore, before sending a stored data portion, a determination may be made as to whether the data portion requires a security measure and implementing the security measure if it is required. As a further example, a process may include encrypting a data portion before sending it over the wireline link or wireless link. Encryption may, for instance, be an additional or alternative security measure when data is sent over a wireline or wireless link. The encrypted data may be destined for the remote facility computer or a computer outside of the remote facility (e.g., remote merchant computer or automated clearing house). As an additional example, a process may not call for determining whether a data portion to be conveyed to a fueling facility computer requires a security measure. As another example, a process may call for determining whether a data portion is to be conveyed to a fueling facility computer before determining whether the data portion is to be stored at a fuel dispenser. As a further example, a process may call for determining whether a data portion requires a security measure before determining whether a data portion is to be conveyed to a fueling facility computer or before determining whether a data portion to be stored at a fuel dispenser. As an additional example, a process may call for one or more operations to be performed contemporaneously (e.g., in an interleaved manner) or simultaneously (e.g., in a parallel manner).

The data security operations of process 1500 may be accomplished by any of a variety of hardware and/or software combinations. For example, the operations may be performed by a management module associated with a dispenser manager, as illustrated in FIG. 2, for example. In such implementations, the operations may be expressed as instructions, and the transaction data may be stored in logs. Such a management module may exclusively provide data security, with or without other management modules providing other services, or provide other services too (e.g., POS, fuel dispenser coordination, and/or dispenser diagnostics).

FIG. 16 illustrates one implementation of a system 1600 for fuel dispenser commerce. In general, system 1600 allows a fuel dispenser at a retail fueling facility 1610 to market and sell the goods and/or services of remote merchants 1620.

Retail fueling facility 1610 includes fuel dispensers 1612, a communication network 1614, and a network interface 1616. Fuel dispensers 1612 may, for example, be similar to fuel dispenser 200 in FIG. 2. Communication network 1614 is coupled to fuel dispensers 1612 and allows the fuel dispensers to communicate with network interface 1616, which is also coupled to communication network 1614. Network interface 1616 may be any appropriate device for allowing communication between the devices at retail fueling facility 1610 and remote devices, such as computers at remote merchants 1620. For example, network interface 1616 may be a gateway, a wide-area network router, or a facility controller.

To allow communication between fuel dispensers 1612 and remote merchants 1620, system 1600 also includes a communication network 1630. Communication network 1630 may be any appropriate system for allowing information exchange, such as, for example, the Internet, a WAN, or a PSTN.

Remote merchants 1620 may be any appropriate sellers of goods and/or services. For example, a merchant may sell durable goods (e.g., car parts or toys), perishable goods (e.g., food), intangible goods (e.g., software or digital media), or services (e.g., oil changes). Remote merchants 1620 may include any appropriate computer systems (e.g., servers and databases) for allowing them to send data regarding their goods and/or services over communication network 1630 to fuel dispensers 1612. Remote merchants 1620 may operate proactively, interactively, and/or or passively with fuel dispensers 1612 to market and/or sell their goods and/or services. For example, the remote merchants may download merchandising content (advertisements and pricing data) to the fuel dispensers at designated times or events, or the remote merchants may download merchandising content to the fuel dispensers upon request. In certain implementations, the remote merchants may maintain a Web portal through which the fuel dispensers may download the content. It should be noted that remote merchants 1620 are remote in the sense that they are not located at retail fueling facility 1610. Thus, the remote merchants may be located in the neighborhood of the retail fueling facility. One or more the merchants, of course, could be located at great distances (e.g., across the state or country) from the retail fueling facility.

In one mode of operation, remote merchants 1620 download data regarding their goods and/or services to fuel dispensers 1612 before the data is required at the fuel dispensers. The data may be downloaded at certain times (e.g., at night), upon certain events occurring (e.g., upon new data being available), or upon request from the fuel dispensers (e.g., if data is corrupted). The downloaded data may include a listing of goods and/or services, along with descriptions and pricing information. The downloaded data could also include text, graphics, audio, and/or video for presentation at the fuel dispenser. The data may be in any appropriate format. Open-standard formats (e.g., ASCII for text, JPEG for bitmaps, GIF or Macromedia for animations, or MPEG or AVI for video) may be especially useful. The downloaded data could be stored as content at the fuel dispensers.

Fuel dispensers 1612 may then determine when to present the merchant data. For example, a fuel dispenser may present the data at certain points of a fueling session (e.g., while fuel is being dispensed or after fuel dispensing is complete). The fuel dispenser may then determine whether the customer indicates interest in the merchant data (e.g., by detecting user input regarding it). If the fuel dispenser detects user interest in merchant data, the fuel dispenser may present additional information regarding the goods and/or services and determine whether the customer desires to order a good and/or service. Additional information regarding goods or services may include textual descriptions, images, audio, and/or video.

If a customer desires to order a good and/or service, the fuel dispenser may acquire order data (e.g., quantity, price, and delivery information). The fuel dispenser may also acquire payment data. For instance, the fuel dispenser may request the customer to present a customer identifier (e.g., a payment card) and enter a PIN. The fuel dispenser may then determine whether the payment data is acceptable. For example, the fuel dispenser may use business rules to determine whether the customer identifier is valid (e.g., by performing a checksum) and whether the amount of the order is within predetermined a limit (e.g., less than $50), which may be based on a customer profile. The fuel dispenser may also evaluate whether the payment data is sufficiently complete. If the payment data is acceptable, the fuel dispenser may then generate a message for the appropriate one of remote merchants 1620 regarding the order and payment information and generate a receipt for the customer. The appropriate merchant may then make arrangement for delivery of the good and/or service.

In another mode of operation, one or more of remote merchants 1620 could provide a portal (e.g., a Web portal) to interact with the fuel dispensers. The portal may be responsible for providing data to the fuel dispenser for presentation, obtaining order data, and/or obtaining payment data. The data may be downloaded before it is required and/or as it is required. The fuel dispenser is, of course, also involved with presenting the merchant data, obtaining the order data, and obtaining the payment data. For example, the fuel dispenser actually presents the advertising data, order data, and payment data. The fuel dispenser also detects order data (e.g., user selection of products and/or services) and payment data (e.g., user selection of payment type). These selections may be conveyed to the portal for handling and/or handled locally. The fuel dispenser and the remote merchant portal may, for example, communicate using standard Web portal calls over a TCP/IP network.

One example of a service that could be ordered from a fuel dispenser is a pizza. A fuel dispenser customer could, for instance, order a pizza while fueling their vehicle. The customer could then pick the pizza up on the way to their destination (e.g., their house) or have the pizza delivered to their destination (e.g., their work). Other examples include ordering goods from catalog merchants (e.g., Lands' End or Eddie Bauer), Internet retailers (e.g., Amazon.com), or traditional retailers (e.g., Wal-mart, Target, or Barnes & Noble). Practically any business that has an on-line functionality may be able to take advantage of this system.

To facilitate customer interaction in particular implementations, a fuel dispenser may be able to retrieve customer-related data. The customer-related data could, for example, be associated with a customer identifier (e.g., a credit card number, a personal identification number (PIN), a telephone number, a radio frequency identifier (RFID) number, or a loyalty program number). The customer identifier may allow for the ready retrieval of the customer-related data. The customer-related data could be information regarding a fueling session (e.g., a type of fuel, a display language for the fuel dispenser display, audio settings for the fuel dispenser, or payment preferences (e.g., Exxon or Visa)), data regarding services at the fueling facility (e.g., car wash, air pump, or water hose), or data regarding the customer (e.g., address and preferred payment types). In particular implementations, the customer-related data could also be used to identify other information that may be of interest to the customer. For example, particular types of merchandise (e.g., drinks, newspapers, or food) or offers (e.g., coupons or advertising) could be presented to the customer. This presentation could, for example, be based on the customer's purchasing habits in a fueling facility store. The customer-related data may be acquired based on customer interaction with a fuel dispenser, or other components at a fueling facility, or based on customer-specified criteria, entered at the fuel dispenser, a local fueling facility computer, or a remote computer (e.g., through a Web interface). The customer-related data may be stored locally at the fueling facility (e.g., at a facility controller) and/or remotely (e.g., at a remote server). In certain implementations, a hash function (e.g., MD5 or the Secure Hashing Algorithm (SHAD)) could be applied the customer identifier before attempting to retrieve customer-related data. This could assist in keeping the customer's identifier confidential.

In regard to commerce for remote merchants at a fuel dispenser, the ability to retrieve customer-related data may provide many features. For example, a fuel dispenser may use retrieved customer data (e.g., buying preference or history) to determine what types of merchant data to present to a customer. A fuel dispenser may, for instance, provide content related to a particular merchant if a customer has indicated an interest in a certain type of product (e.g., through predesignated preferences or buying history). The fuel dispenser may also be able to expedite a transaction by being able to present payment options to the customer. For example, the customer-related data may contain information regarding payment methods (e.g., credit cards, debit cards, etc.) that a customer typically uses. If this information is available, the fuel dispenser may be able to present the user (e.g., with text or graphic symbols) with one or more choices (e.g., gas card, credit card, or debit card) to use for paying for the goods and/or services. The user may then select the appropriate data by using a touch screen, stylus, keypad, or other appropriate device. A user would therefore not have to swipe, or even have, the preferred customer identifier. The fuel dispenser could, of course, collect an identifier (e.g., PIN or password) if security measures were required. As another example, the fuel dispenser may be able to facilitate delivery of products and/or services purchased from a remote merchant. The fuel dispenser may, for instance, be able to present one or more addresses associated with the user (e.g., home or office) and/or inquire whether the customer desires to have a good and/or service delivered to a particular address. The address selection may, for example, be made through the fuel dispenser presenting the user with text or graphics symbols representing the address. The user may then select the appropriate data by using a touch screen, stylus, keypad, or other appropriate device.

In particular implementations, the remote merchant data may be tied into a digital merchandising framework. The framework may allow the retailer to control what content is presented on the fuel dispensers. The retailer may, for example, choose among content from one or more remote merchants and local content, which may be of the retailer's creation. The framework may, in fact, allow the retailer to create content for the fuel dispensers. For example, the framework may provide a Web site at which the retailer may log on to create content. The local content could, for example, offer products and/or services of the retailer (e.g., coffee, oil, car washes, etc.). The remote merchant data and the retailer created data may be stored at a gateway (e.g., a PC) at the fueling facility. The retailer may then select what content is to be displayed by the fuel dispensers. Selections may also be fine tuned for time of day, temperature, etc. The selected content may be downloaded from the gateway to the fuel dispensers for presentation at appropriate times.

System 1600 has a variety of features. Customers, for example, are able to use their downtime while fueling their cars to order goods and/or services. This may be quite a convenience for busy customers. Moreover, the ordering and payment for goods and/or services may occur even if some of the fueling facility's components are temporarily unavailable. As another example, retail fueling facilities are provided with another revenue stream, through, for example, advertising and sales-revenue sharing from the remote merchants. Moreover, providing these capabilities for a fuel dispenser may allow additional capabilities, some of which have been discussed previously, to be implemented.

Although system 1600 illustrates one implementation of a system for fuel dispenser commerce, other systems for fuel dispenser commerce may have fewer, additional, and/or a different arrangement of components. For example, the fuel dispensers may not communicate with the remote merchants though communication facilities of the retail fueling facility. The fuel dispensers may, for instance, have couplings to a distributed communication network (e.g., the Internet) or may be able to communication data wirelessly (e.g., by using GPRS or IEEE 802. 11) to a communication network, which could be a wireless network (e.g., a cellular telephone network) or a wireline network (e.g., the Internet). Note that a wireless network or a wireline network may use a combination of wireline and wireless techniques for conveying data internally. In these cases, retail fueling facility 1610 may or may not have a network interface. As another example, the retail fueling facility may include additional components, such as a store interface unit or a facility controller. As a further example, the remote merchants may be located at various geographic locations (e.g., in the neighborhood of the retail fueling facility and/or across the country from the retail fueling facility).

Various implementations of systems for fuel dispenser commerce may operate in one or more modes. For example, a fuel dispenser may download data regarding one or more goods or services as needed from the remote merchant. This may be useful for alleviating memory constraints at the fuel dispensers. As another example, determining the validity of payment data may include soliciting assistance from outside sources (e.g., a remote merchant or an automated clearing house).

FIG. 17 illustrates one example of a merchant 1700 for fuel dispenser commerce. Merchant 1700 may be one example of a remote merchant 1620 of system 1600.

Merchant 1700 includes a computer system 1710. Computer system 1710 may, for example, be a personal computer or a server, and has the capability to provide data regarding the merchant to fuel dispensers such as fuel dispenser 1610 of system 1600. Merchant 1700 may also include a variety of other computer systems and/or components.

Computer system 1710 includes a processor 1720, a network interface 1730, and memory 1740. Processor 1720 operates according instructions 1750, which include an operating system 1752 (e.g., Windows, Unix, or Linux) and applications 1754 (e.g., word processing, spreadsheet, inventory control, accounting, and sales). According to applications 1754, processor 1720 manipulates data 1760, which includes marketing data 1762, inventory data 1764, and sales data 1766. Marketing data 1762 may, for example, include information that describes (e.g., in written text or image format) goods and/or services of the merchant. Inventory data 1764 may, for example, include information regarding the current supply of goods and/or services for the merchant. Sales data 1766 may, for example, include information regarding purchases of the merchant's goods and/or services. Processor 1720 may work in cooperation with network interface 1730 to communicate data to remote systems (e.g., fuel dispensers). Network interface 1730 may, for example, be a modem, a network interface card, or a wireless transceiver.

In one mode of operation, processor 1720 may determine that a remote fuel dispenser should have data regarding goods and/or services of the merchant. This determination may, for example, be in response to a request from the remote fuel dispenser or because of an update in the data. Processor 1720 may then retrieve the data (e.g., from marketing data 1762) and generate an appropriate message for the fuel dispenser. The message may be sent through network interface 1730.

Computer system 1710 may then wait to receive sales data from the fuel dispenser. The sales data may indicate a quantity of goods and/or services ordered as well as a method of payment. Using this information, processor 1720 may update inventory data 1764 and sales data 1766. Computer system 1710 also may be responsible for submitting the payment for collection (e.g., to its bank or an automated clearing house).

Other modes of operation may include fewer, additional, and/or a different arrangement of operations. For example, a remote fuel dispenser may communicate with computer system 1710 for data regarding a good and/or a service when the fuel dispenser requires information about a good and/or service, such as when a customer of the fuel dispenser indicates interest in a good and/or a service. As another example, a remote fuel dispenser may communicate with computer system 1710 when a customer of the fuel dispenser indicates a desire to purchase a good and/or a service. The computer system may then determine the availability of and/or delivery data for the good and/or service and provide this to the fuel dispenser. As a further example, a fuel dispenser may communicate with computer system 1710 for assistance with determining whether payment data is acceptable. The computer system may, for instance, determine whether the purchase is authorized (e.g., by validating a credit card issued by the merchant).

FIG. 18 illustrates one implementation of a process 1800 for fuel dispenser management. Process 1800 is generally directed to fuel dispenser operations for fuel dispenser commerce. Process 1800 may be one example of a process implemented by a fuel dispenser 1612 of system 1600.

Process 1800 begins with determining whether merchant data should be presented at the fuel dispenser (operation 1804). Merchant data may, for example, be presented in response to a predetermined event during a fueling session (e.g., dispensing fuel). If merchant data should be presented, process 1800 calls for generating a user interface including merchant data (operation 1808). Generating a user interface may, for example, include forming the user interface and presenting (e.g., displaying) the user interface.

Process 1800 continues with determining whether user input regarding merchant data has been received (operation 1812). Determining whether user input regarding merchant data has been received may, for example, include detecting activation of a user input device (e.g., a keypad or a touchpad) related to the user interface. If user input regarding the merchant data has not been received, process 1800 calls for determining whether to continue presenting the user interface (operation 1816). The user interface may, for example, be removed if a fueling session has reached a particular stage (e.g., the end of fuel dispensing). If the user interface may continue to be presented, process 1800 calls for continuing to wait for user input regarding the merchant data (operation 1812). If, however, the user interface may not continue to be presented, process 1800 calls for again determining whether merchant data should be presented at the fuel dispenser (operation 1804).

If user input regarding the merchant data has been received, which may indicate customer interest in goods and/or services of a merchant, process 1800 continues with generating a user interface for obtaining ordering data (operation 1820). The user interface may, for example, include data regarding products and/or services, order quantities, and prices. Process 1800 also calls for waiting to receive user input regarding ordering data (operation 1824).

Once user input regarding ordering data has been received, process 1800 calls for determining whether the order is complete (operation 1828). If the order is not complete, process 1800 calls for continuing to wait for ordering data (operation 1824).

Once the order is complete, process 1800 calls for generating a user interface for obtaining payment data (operation 1832). The payment data interface may, for example, request the customer to present a customer identifier (e.g., a payment card) and/or to enter certain information (e.g., a name, account number, and/or PIN). Process 1800 calls for waiting to detect user input regarding the payment data (operation 1836).

Once user input regarding payment data has been received, process 1800 calls for determining whether the payment data is complete (operation 1840). If the payment data is not complete, process 1800 calls for continuing to wait for user input regarding payment data (operation 1836).

Once the payment data is complete, process 1800 calls for determining whether the payment data is acceptable (operation 1844). Determining whether the payment data is acceptable may, for example, include determining whether a customer identifier is valid, whether the goods and/or services are acceptable for the customer, and/or whether the total price is acceptable. This determination may be made based on data stored at the fuel dispenser or upon data retrieved from another component (e.g., a remote merchant or an automated clearing house). If the payment data is not acceptable, process 1800 calls for again generating a user interface for obtaining payment data (operation 1832). This user interface may, for instance, contain the payment data previously entered except for payment data determined to be erroneous (e.g., a PIN). Fields for the erroneous data may or may not be specially designated. If, however, the payment data is acceptable, a message regarding the ordering data (e.g., product identifiers, quantity, and delivery instructions) is generated for a remote merchant (operation 1848). The remote merchant may use the data in the message to delivery the requested goods and/or services. Process 1800 continues with again determining whether merchant data should be presented (operation 1804).

While FIG. 18 illustrates a process for achieving fuel dispenser commerce, other processes for fuel dispenser commerce may include fewer, additional, and/or a different arrangement of operations. For example, a process may call for successively generating a number of user interfaces for presenting merchant data (e.g., one for each merchant). As another example, a process may call for generating a user interface including data regarding a good and/or service that is indicated to be of interest. This may be accomplished before, during, or after obtaining ordering data. As a further example, a process may not include obtaining ordering data. This may, for instance, occur if a predesignated quantity of a good and delivery option exist. As an additional example, a process may allow a customer to purchase goods and/or services from more than one merchant before determining whether to present merchant data again. As another example, a process may include generating a message regarding payment data and sending the message to a remote merchant. In some implementations, the payment data may be sent in the same message as the ordering data. However, the ordering data may be sent prior to the payment data. For example, this message may be sent prior to even obtaining payment data.

A number of implementations have been described, and a variety of other implementations have been mentioned or suggested. Furthermore, numerous additions, deletions, substitutions, and/or modifications will be readily suggested to those skilled in the art while still achieving fuel dispenser management. For at least these reasons, the protected subject matter is to be measured by the following claims, which may encompass one or more concepts of one or more of these implementations.

The invention claimed is:

1. A method performed by a fuel dispenser, the method comprising:
   receiving a first portion and a second portion of transaction data for a fueling session;
   storing the first portion on the fuel dispenser; and
   applying a security measure to a first part of the second portion of the received transaction data,
   determining that a second part of the second portion of the received transaction data does not require the security measure,
   preparing at least one of the first part of the second portion of the received transaction data and the second part of the second portion of the received transaction data for conveyance over a wireline communication link; and
   preparing the other one of the first part of the second portion of the received transaction data and the second part of the second portion of the received transaction data for conveyance over a wireless communication link.

2. The method of claim 1, wherein transaction data comprises financial information of a customer.

3. The method of claim 1, wherein determining whether at least a portion of the received transaction data requires a security measure comprises determining whether at least a portion of the received transaction data is to be stored at the fuel dispenser for more than a transitory period of time.

4. The method of claim 3, wherein received transaction data may be stored at the fuel dispenser for more than a transitory period of time if the fuel dispenser is not able to communicate with a fueling facility computer.

5. The method of claim 3, wherein the security measure comprises encrypting at least a portion of the received transaction data that requires the security measure.

6. The method of claim 5, wherein the encryption uses a symmetric key of 512 bits.

7. The method of claim 1, wherein determining whether at least a portion of the received transaction data requires a security measure comprises determining whether at least a portion of the received transaction data is to be communicated to a fueling facility computer.

8. The method of claim 7, wherein the security measure comprises:
   preparing at least a portion of the received transaction data that requires a security measure for conveyance over a wireline communication link; and
   preparing at least a portion of the received transaction data that does not require a security measure for conveyance over a wireless communication link.

9. The method of claim 7, wherein the security measure comprises encrypting at least a portion of the received transaction data that requires a security measure before conveyance over a communication link.

10. A fuel dispenser, comprising:
    a user input device operable to receive transaction data for a fueling session, the transaction data comprising a first portion and a second portion; and
    a processor operable to execute instructions stored on tangible, computer-readable and non-transitory media to:
    determine that the first portion of the received transaction data is to be stored on the fuel dispenser and the second portion of the received transaction data is to be communicated to a fueling facility computer;
    determine that a first part of the second portion of the received transaction data requires a security measure,
    apply the security measure to the first part of the second portion of the received transaction data that requires the security measure,
    determine that a second part of the second portion of the received transaction data does not require the security measure, and
    prepare at least one of the first part of the second portion of the received transaction data and the second part of the second portion of the received transaction data for conveyance over a wireline communication link, and
    prepare the other one of the first part of the second portion of the received transaction data and the second part of the second portion of the received transaction data for conveyance over a wireless communication link.

11. The fuel dispenser of claim 10, further comprising a memory, the memory comprising a rule set, wherein the processor is operable to make the determination that at least a part of the second portion of the received transaction data requires a security measure based on one or more rules in the rule set.

12. The fuel dispenser of claim 10, wherein the processor is further operable to:
    determine that the first portion of the received transaction data is to be stored at the fuel dispenser for a time duration between approximately three nanoseconds and approximately three seconds; and
    determine that a part of the first portion of the received transaction data requires a second security measure based on the determination that the first portion of the received transaction data is to be stored at the fuel dispenser for more than the time duration.

13. The fuel dispenser of claim 12, wherein received transaction data may be stored at the fuel dispenser for more than the time duration if the fuel dispenser is not able to communicate with the fueling facility computer.

14. The fuel dispenser of claim 12, wherein the processor is further operable to encrypt the part of the first portion of the received transaction data that requires the second security measure to apply the second security measure.

15. The fuel dispenser of claim 10, wherein the processor is further operable to prepare the first part of the second portion of the received transaction data that requires the security measure for conveyance over the wireline communication link and to prepare the second part of the second portion of the received transaction data that does not require the security measure for conveyance over the wireless communication link.

16. The fuel dispenser of claim 10, wherein the security measure encrypts the first part of the second portion of the received transaction data that requires the security measure before conveyance over the wireline communication link.

17. An article of manufacture comprising a machine-readable medium storing instructions operable to cause a fuel dispenser to perform operations comprising:
receiving a first portion and a second portion of transaction data for a fueling session;
storing the first portion on the fuel dispenser; and
applying a security measure to a first part of the second portion of the received transaction data,
determining that a second part of the second portion of the received transaction data does not require the security measure,
preparing at least one of the first part of the second portion of the received transaction data and the second part of the second portion of the received transaction data for conveyance over a wireline communication link; and
preparing the other one of the first part of the second portion of the received transaction data and the second part of the second portion of the received transaction data for conveyance over a wireless communication link.

18. The article of claim 17, further comprising determining whether the first portion of the received transaction data is to be stored at the fuel dispenser for more than a transitory period of time.

19. The article of claim 18, further comprising encrypting at least a portion of the received transaction data that requires the security measure.

20. The article of claim 17, further comprising determining whether the first portion or the second portion of the received transaction data is to be communicated to a fueling facility computer.

21. The article of claim 20, wherein the first part of the second portion of the received transaction data that requires a security measure is prepared for conveyance over a wireline communication link and the second part of the second portion of the received transaction data that does not require a security measure is prepared for conveyance over a wireless communication link.

22. The article of claim 17, further comprising encrypting the first part of the second portion of the received transaction data that requires a security measure before conveyance over a communication link.

23. A fuel dispenser, comprising:
means for receiving transaction data for a fueling session;
means for determining that a first portion of the received transaction data is to be stored on the fuel dispenser and a second portion of the received transaction data is to be communicated to a fueling facility computer;
means for determining that at least a first part of the second portion of the received transaction data requires a security measure;
means for applying the security measure to the first part of the second portion of the received transaction data that requires the security measure;
means for determining that a second part of the second portion of the received transaction data does not require the security measure;
means for preparing at least one of the first part of the second portion of the received transaction data and the second part of the second portion of the received transaction data for conveyance over a wireline communication link; and
means for preparing the other one of the first part of the second portion of the received transaction data and the second part of the second portion of the received transaction data for conveyance over a wireless communication link.

24. The fuel dispenser of claim 23, further comprising:
means for determining that the first portion of the received transaction data is to be stored at the fuel dispenser for a time duration between approximately three nanoseconds and approximately three seconds; and
means for determining that a part of the first portion of the received transaction data requires the security measure based on the determination that the first portion of the received transaction data is to be stored at the fuel dispenser for more than the time duration.

25. The fuel dispenser of claim 24, further comprising encrypting the part of the first portion of the received transaction data that requires the security measure.

26. The fuel dispenser of claim 23, wherein the means for applying the security measure comprises:
means for preparing the first part of the second portion of the received transaction data that requires the security measure for conveyance over the wireline communication link; and
means for preparing the second part of the second portion of the received transaction data that does not require the security measure for conveyance over the wireless communication link.

27. The fuel dispenser of claim 23, further comprising means for encrypting the first part of the second portion of the received transaction data that requires the security measure before conveyance over the wireline communication link.

28. A fuel dispenser, comprising:
a user input device operable to receive first transaction data for a first fueling session from a fueling customer and second transaction data for the first fueling session from the fueling customer;
a management module stored in memory on the fuel dispenser; and
a processor operable to execute the management module, wherein the management module is operable when executed to:
receive transaction data comprising a first portion and a second portion;
determine that the first portion of the received transaction data is to be stored on the fuel dispenser;
determine that the first portion of the received transaction data to be stored on the fuel dispenser comprises confidential customer information of a first type;
encrypt the first portion of the received transaction data comprising confidential customer information of the first type;
store the encrypted first portion of the received transaction data on the fuel dispenser;
determine that the second portion of the received transaction data is to be communicated to a fueling facility computer,
determine that the received second transaction data to be communicated to the fueling facility computer comprises a first part and a second part, wherein one of the first part and the second part has confidential customer information of a second type;
prepare at least one of the first part of the second portion of the received transaction data and the second part of the second portion of the received transaction data for conveyance over a wireline communication link;

prepare the other one of the first part of the second portion of the received transaction data and the second part of the second portion of the received transaction data for conveyance over a wireless communication link; and transmit the one of the first part and the second part of the second portion of the received transaction data to the fueling facility computer by the wireline communication link.

29. The fuel dispenser of claim 28, wherein the received transaction data includes a third portion and the management module is further operable when executed to:

determine that the third portion of the received transaction data is to be communicated to the fueling facility computer, determine that the third portion of the received transaction data to be communicated to the fueling facility computer comprises non-confidential information; and transmit the third portion of the received transaction data to the fueling facility computer by the wireless communication link.

30. The fuel dispenser of claim 15, wherein the processor is further operable to:

determine that the first portion of the received transaction data is to be stored at the fuel dispenser for a time duration between approximately three nanoseconds and approximately three seconds; and encrypt the first portion of the received transaction data based on the determination that the first portion of the received transaction data is to be stored at the fuel dispenser for more than the time duration.

31. The fuel dispenser of claim 26, further comprising:

means for determining that the first portion of the received transaction data is to be stored at the fuel dispenser for a time duration between approximately three nanoseconds and approximately three seconds; and means for encrypting the first portion of the received transaction data based on the determination that the first portion of the received transaction data is to be stored at the fuel dispenser for more than the time duration.

* * * * *